(12) United States Patent
Toda

(10) Patent No.: US 11,618,181 B2
(45) Date of Patent: Apr. 4, 2023

(54) VENEER CUTTING AND SORTING APPARATUS

(71) Applicant: Meinan Machinery Works, Inc., Obu (JP)

(72) Inventor: Kenro Toda, Obu (JP)

(73) Assignee: Meinan Machinery Works, Inc., Obu (JP)

( * ) Notice: Subject to any disclaimer, the term of this patent is extended or adjusted under 35 U.S.C. 154(b) by 290 days.

(21) Appl. No.: 16/857,775

(22) Filed: Apr. 24, 2020

(65) Prior Publication Data

US 2021/0178630 A1  Jun. 17, 2021

(30) Foreign Application Priority Data

Dec. 16, 2019  (JP) .............................. JP2019-226327

(51) Int. Cl.
| | | |
|---|---|---|
| *B27L 5/00* | (2006.01) | |
| *B26D 1/40* | (2006.01) | |
| *B27L 5/08* | (2006.01) | |
| *B65G 47/04* | (2006.01) | |
| *B65G 47/48* | (2006.01) | |
| *B65G 47/56* | (2006.01) | |
| *B27L 5/02* | (2006.01) | |

(52) U.S. Cl.
CPC .............. *B27L 5/002* (2013.01); *B26D 1/405* (2013.01); *B27L 5/08* (2013.01); *B65G 47/04* (2013.01); *B65G 47/485* (2013.01); *B65G 47/56* (2013.01); *B27L 5/025* (2013.01)

(58) Field of Classification Search
CPC ... B27L 5/00; B27L 5/002; B27L 5/08; B27G 1/00
See application file for complete search history.

(56) References Cited

U.S. PATENT DOCUMENTS

| | | | |
|---|---|---|---|
| 4,397,204 A | 8/1983 | Colombo | |
| 4,781,090 A * | 11/1988 | Feldkamper | ............. B26D 5/34 |
| | | | 83/365 |
| 4,989,651 A | 2/1991 | Snellgrove | |
| 5,974,923 A * | 11/1999 | Rigby, Jr. | ................. B27L 5/08 |
| | | | 144/357 |

(Continued)

FOREIGN PATENT DOCUMENTS

| | | |
|---|---|---|
| DE | 3100812 A1 | 1/1982 |
| JP | S61-28484 B2 | 6/1986 |

(Continued)

OTHER PUBLICATIONS

European Search Report dated May 18, 2021, issued for European Patent Application No. 20166839.9.

*Primary Examiner* — Matthew Katcoff
(74) *Attorney, Agent, or Firm* — Locke Lord LLP

(57) ABSTRACT

A veneer cutting and sorting apparatus is disclosed. The apparatus includes a revolvable knife blade having a cutting edge and a revolvable knife edge receiver having a cutting edge receiving surface. The knife blade cuts a veneer sheet as peeled from a peeler block by a veneer lathe at a previously detected boundary between defective veneer portion and product veneer sheet on the cutting edge receiving surface then revolving at the same peripheral speed as the cutting edge of the knife blade. Cut-off defective portion is allowed to drop off by its own weight.

16 Claims, 19 Drawing Sheets

(56) References Cited

U.S. PATENT DOCUMENTS

| 6,360,640 B1* | 3/2002 | Cote | B26D 5/20 |
| | | | 83/287 |
| 2008/0072999 A1* | 3/2008 | Puranen | B27G 1/00 |
| | | | 144/357 |

FOREIGN PATENT DOCUMENTS

| JP | 06055506 A | * | 3/1994 |
| JP | 2008-30263 A | | 2/2008 |

* cited by examiner

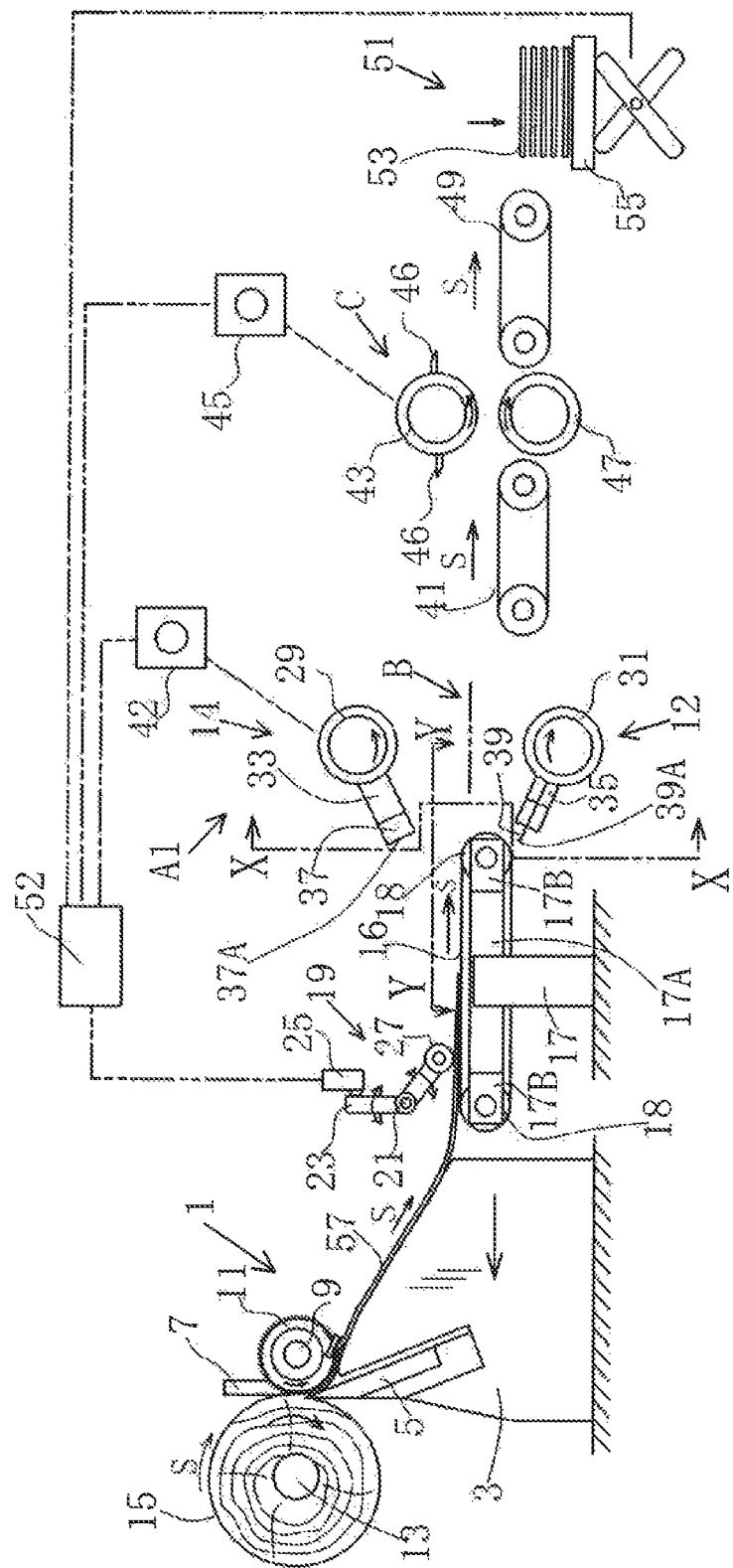

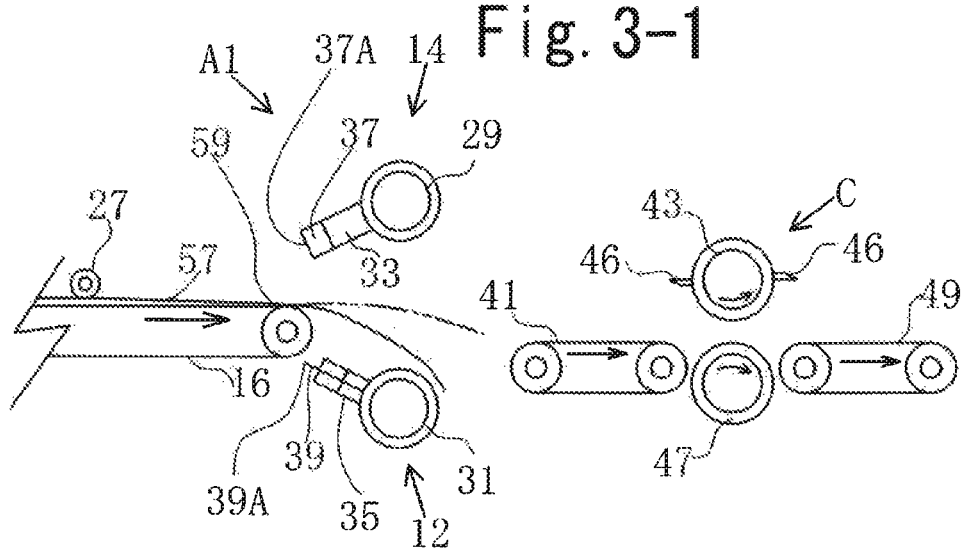
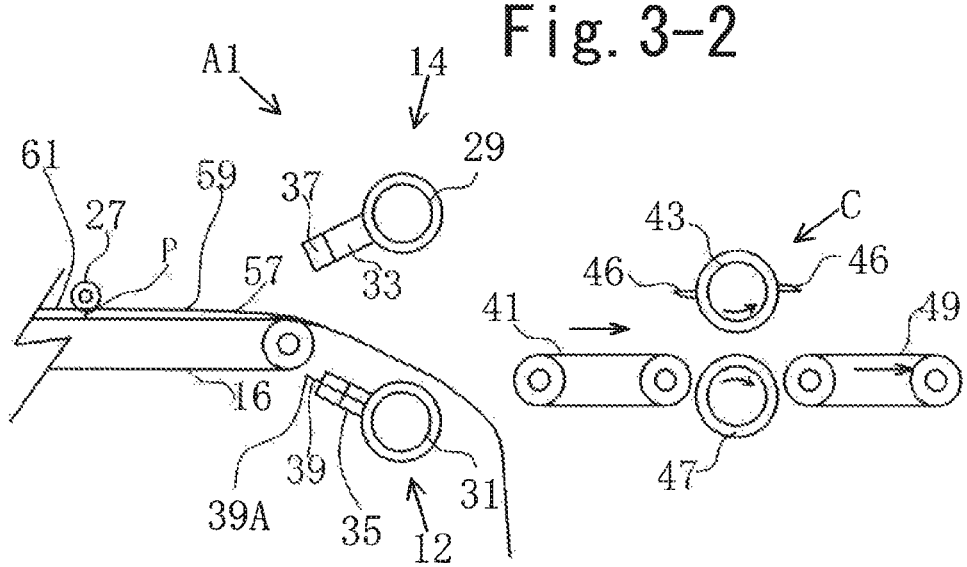

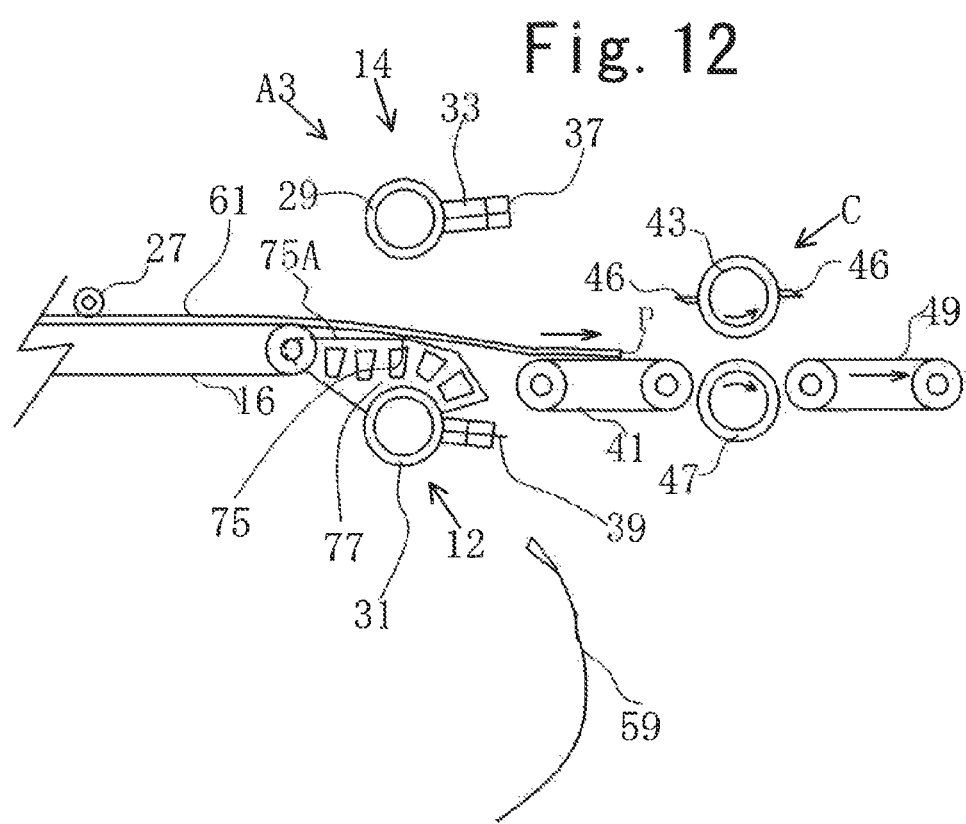

VENEER CUTTING AND SORTING APPARATUS

TECHNICAL FIELD

The present invention relates to a veneer cutting and sorting apparatus.

BACKGROUND

Wood veneer used in manufacturing laminated wood product such as plywood, LVL (laminated veneer lumber) and the like is produced by peeling a wood block, or a generally cylindrical section cut from a log into a predetermined length. Specifically, the peeler block is rotated at a constant surface or peripheral speed and a veneer knife is cut into the rotating block for a predetermined distance for each rotation of the peeler block. Veneer thus cut from the peeler block is delivered continuously to a next station by a conveyor running at substantially the same speed as the surface speed of the block. Nowadays, the peeler block is rotated at a high surface speed, for example, about 150 m/min, to meet the demand for increasing the productivity. Veneer sheet produced during the initial stage of peeling operation has portions whose thickness is smaller than a thickness that is desired for production of, for example, plywood. Such portion of veneer is regarded as defective and need be removed from product veneer sheet. For removing the defective portion, a veneer sheet as peeled from a block and moved forward by a conveyor is cut by a knife at a boundary position between the defective portion and its succeeding product veneer sheet having the desired thickness, and the defective portion is rejected. Sorting the defective portion and the product veneer sheet may be performed by an apparatus which is disclosed, for example, in the Examined Japanese Patent Application Publication S61-28484.

According to this prior art apparatus, a veneer sheet X peeled by a knife blade 1c of a rotary veneer lathe is cut by a veneer clipper 2 into product veneer Z and trash veneer Z1, Z2 while being transferred by a conveyor 2a. Subsequently, the product veneer Z and trash veneer Z1, Z1 are all picked up by a piercing conveyor 3a having pickup needles pierceable into the product veneer Z1 and the trash veneer Z1, Z2 from above, and then transferred toward an intermediate conveyor 3f. A sorting lever 3b is pivotally mounted in the piercing conveyor 3a, which is pivotable between the lowered position where the lever 3b intersects the conveyor belt of the lower leg of the piercing conveyor 3a and the upper retracted position where the lever 3b is located within the piercing conveyor 3a. In operation of the apparatus, the sorting lever 3b, which is initially placed in the intersecting lowered position, is actuated to turn to the upper retracted position when the leading edge of the product veneer Z arrives following the trash veneer Z1. By so doing, the trash veneer Z1 is dropped down by the sorting lever 3b while the product veneer Z is allowed to move toward the intermediate conveyor 3f. The sorting lever 3B is turned to the lowered intersecting position when the leading edge of the trash veneer Z2 arrives subsequently to the product veneer Z, so that the product veneer Z is released from the piercing conveyor 3a by the roller 3e of the conveyor 3a and transferred to the intermediate conveyor 3f, while the trash veneer Z2 is dropped away from the product veneer Z. It is noted that the above description uses the same reference numerals and symbols that are used in the above-cited publication.

As indicated above, today's veneer lathe is required to cut veneer at a speed as high as 150 m/min or higher in order to achieve the desired veneer productivity. However, the above-described prior art apparatus has a problem in that actuating the sorting lever 3b accurately at the timing required for correct sorting between the product veneer and the trash veneer running at a high speed is quite difficult. In a conventional apparatus, it has been practiced to either stop temporarily or slow down the veneer peeling and transportation so as to permit the removal of trash veneer, for example, by manual operation. Veneer peeling and transportation are resumed after the removal of trash veneer. Failure in sorting veneer running at a high speed makes difficult to achieve the improvement of veneer productivity and hence of manufacturing of laminated wood product.

SUMMARY OF THE INVENTION

In order to meet the demand for improving the productivity of veneer processing by allowing veneer defective portion to be cut off from product veneer sheet and discarded without interrupting the flow of veneer sheet, there is provided a veneer cutting and sorting apparatus. The apparatus is configured to cut a veneer sheet as peeled from a peeler block at a previously detected boundary position between a defective veneer portion and its succeeding product veneer sheet and to simultaneously separate the defective portion from the product veneer sheet.

According to an aspect of the invention, the apparatus comprises a knife assembly and a knife edge receiver assembly that are disposed one assembly above the other across a path along which the veneer sheet is conveyed by a first veneer conveyor. The knife assembly includes a first roll having an axis of rotation extending across the veneer conveying direction and a knife blade having a cutting edge and mounted to the first roll through a mounting for revolving with the rotation of the first roll. The second assembly includes a second roll disposed axially parallel to the first roll and a knife edge receiver having a cutting edge receiving surface and mounted to the second roll through a mounting for revolving with the rotation of the second roll.

The apparatus further comprises a servomotor that controllably drives the first and the second rolls through a gear transmission that is configured to drive the first and the second rolls in opposite direction, and a control that controls the operation of the servomotor and hence of the two rolls.

The control is operable to determine the current position the detected boundary in the veneer sheet being moved by the first conveyor and to control the servomotor for controllably rotating the first and the second rolls for cutting of the veneer sheet at the boundary. Specifically, the control is operable to cause the first and the second rolls to start rotating from predetermined initial standby positions thereof at such a timing that permits the knife blade to cut the veneer sheet at the boundary on the cutting edge receiving surface. At least during the cutting, the first and the second rolls are rotated at such speeds that the cutting edge of the knife blade and the cutting edge receiving surface of the knife edge receiver are revolved at the same peripheral speed. After the cutting of the veneer sheet is over, the first and the second rolls may be rotated to the respective initial standby positions.

A second veneer conveyor is disposed downstream of and spaced from the knife and the knife edge receiver assemblies, to which the product veneer sheet is transferred. The defective portion cut off from the product veneer sheet is dropped by its own weight through a space formed between the assemblies and the second veneer conveyor.

According to another aspect of the invention, the apparatus further comprises an auxiliary support member mounted on the lower roll immediately behind the mounting for the knife blade or the knife edge receiver, as the case may be, with respect to the rotating direction of the lower roll for supporting the product veneer sheet after the cutting. In this case, the lower roll is stopped at the position where the auxiliary support member supports the product veneer sheet at the bottom thereof.

According to still another aspect of the invention, the apparatus further comprises a guide member fixed on the upper roll and having a guide surface formed so as to divert the defective portion downward through the space between the assemblies and the second veneer conveyor.

In the apparatus according to the present invention, cutting veneer and the subsequent sorting between the cut-off defective portion and the product veneer sheet may be performed without interrupting the flow of veneer sheet by allowing the cut-off defective portion to drop off by its own weight before reaching the second veneer conveyor and the product veneer sheet to be supported while being transferred toward the second veneer conveyor.

BRIEF DESCRIPTION OF THE DRAWINGS

FIG. 2-1 is a view showing a knife assembly, a knife edge receiver assembly, and a gear transmission, as seen in arrow direction from chain double-dashed line X-X of FIG. 1;

FIG. 2-2 is a view showing the gear transmission as seen in arrow direction from chain double-dashed line Z-Z of FIG. 2-1;

FIG. 2-3 is a fragmentary top view as seen in arrow direction from chain double-dashed line Y-Y of FIG. 1;

FIGS. 3-1 through 8 are schematic side views illustrating the operation of the apparatus according the first embodiment;

FIGS. 9-1 through 10-2 are schematic side views illustrating the operation of the apparatus according to second embodiment of the present invention;

FIGS. 11-1 through 12 are schematic side views illustrating the operation of the apparatus according to third embodiment of the present invention;

FIGS. 13-1 through 14-2 are schematic side views illustrating the operation of the apparatus according to fourth embodiment of the present invention;

FIG. 15-1 is a schematic side view illustrating the operation of the apparatus according to fifth embodiment of the present invention;

FIG. 15-2 is a schematic side view illustrating the operation of the apparatus according to sixth embodiment of the present invention;

FIG. 16-1 is a schematic side view illustrating the operation of the apparatus according to seventh embodiment of the present invention;

FIG. 16-2 is a schematic view as seen in arrow direction from chain double-dashed line R-R of FIG. 16-1;

FIGS. 17-1 and 17-2 are schematic side views illustrating the operation of the apparatus according to seventh embodiment of the present invention;

FIG. 18-1 is a schematic side view illustrating the apparatus according to a modified embodiment of the present invention;

FIG. 18-2 is a schematic side view illustrating the apparatus according to another modified embodiment of the present invention;

FIG. 19-1 is a schematic view showing a knife assembly, a knife edge receiver assembly, and a modified power transmission; and FIG. 19-2 is a schematic side view showing the power transmission as seen in arrow direction from chain double-dashed line H-H of FIG. 19-1.

FIRST EMBODIMENT

The first embodiment of the veneer cutting and sorting apparatus according to the present invention will be described in the following with reference to relevant drawings.

Figures 1, 2:
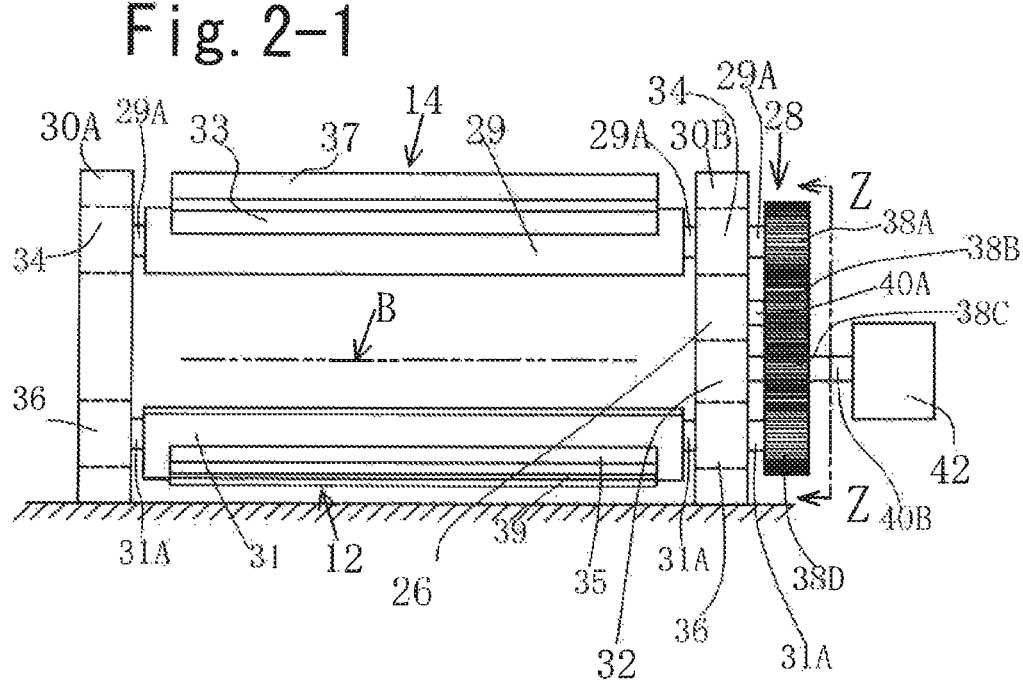
Figure 2:
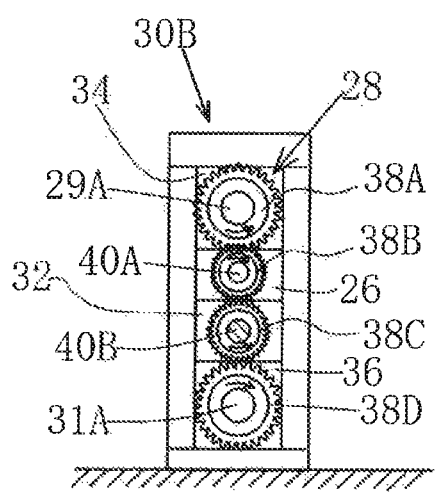

Referring firstly to FIG. 1, reference numeral 1 designates a rotary veneer lathe, 19 a veneer detecting station, reference symbol A1 a veneer cutting and sorting station, C a veneer sheet cutting station, and numeral 51 a veneer sheet stacking station, respectively.

The veneer lathe 1 includes a pair of spindles 13 (only one shown in the drawing) that hold therebetween a peeler block 15 at the opposite ends thereof and drive to rotate the same block 15. Rotation of the spindles 13 is so controlled that the block 15 is rotated at a constant surface speed S of, for example, about 150 m/min. The veneer lathe 1 further includes a knife carriage 3 that is configured to move toward the spindles 13 for a predetermined distance for each rotation of the spindles 13. A knife blade 5 is fixedly mounted to the knife carriage 3 on the side thereof adjacent to the spindles 13. A plurality of nose bars 7 (only one shown in the drawing) is mounted immediately above the knife blade 5 at a spaced interval in the axial direction of the spindles 13. Furthermore, a plurality of spiked wheels 11 is mounted on a common shaft 9 driven to rotate by a motor (not shown) to assist in driving the block 15 from the periphery thereof. Each spiked wheel 11 is disposed at a position between any two adjacent nose bars 7. The spiked wheel 11 is driven to rotate at such a speed that the tip ends of the spikes of the wheel 11 is revolved at a speed that corresponds to the surface speed S of the peeler block 15.

Figures 2, 3:
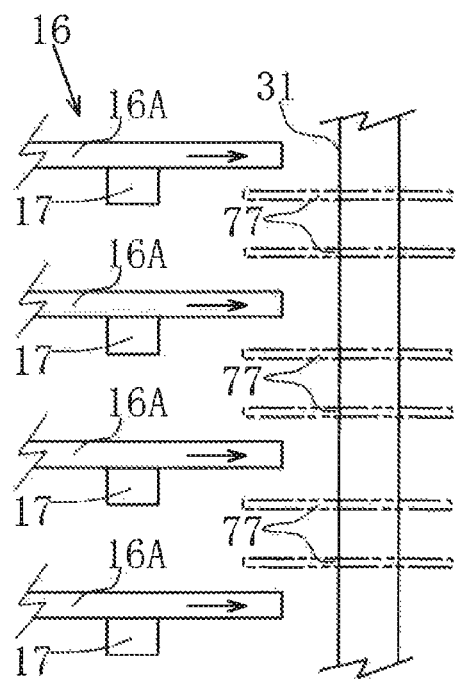

Reference numeral 16 designates a first veneer conveyor disposed between the veneer lathe 1 and the veneer cutting and sorting station A1. The first veneer conveyor 16 includes a plurality of endless belts 16A arranged at a spaced interval in the lateral direction of the apparatus, or across the direction in which veneer is moved by the conveyor 16 as indicated by arrows in FIGS. 1 and 2-3, and running constantly in arrow direction at a speed corresponding to the surface speed S of the block 15. Referring to FIGS. 1 and 2-3, numeral 17 designates a plurality of support columns disposed at a spaced interval in the lateral direction of the apparatus. An elongated mounting 17A is fixed at the longitudinal center thereof to each support column 17 at the upper end thereof. The elongated mounting 17A has at the opposite ends thereof a pair of pulley supports 17B each having mounted therein a pulley 18. As shown in FIG. 1, each endless belt 16A of the first veneer conveyor 16 is mounted between and around the paired pulleys 18, and one of the pulleys 18 is operatively connected to a drive motor (not shown) through any suitable belt drive arrangement (not shown either) for driving to move the belts 16A constantly in arrow direction at the aforementioned speed S. Incidentally, numeral 77 in FIG. 2-3 indicating imaginary lines designates a plurality of auxiliary support members used in third embodiment which will be described in later part hereof.

The veneer detecting station or veneer detector 19, as the case may be, is of a known type in the art to which the present invention pertains and detects a boundary between a defective veneer portion and its succeeding product veneer sheet. Specifically, the veneer detector 19 is configured to detect an imaginary straight line of boundary on veneer sheet that extends in the lateral direction of the apparatus and lies between a defective veneer portion having an irregularly shaped edge and a thickness smaller than required, on one hand, and a veneer sheet having the required thickness, on the other, of the veneer sheet as peeled by the veneer lathe 1 and delivered onto the first conveyor 16. The latter veneer sheet will be hereinafter referred to as product veneer sheet or simply veneer sheet. The veneer detector 19 includes a plurality of detecting arms 23 pivotally mounted at a spaced interval on a common shaft 21 which is fixed to a frame (not shown) of the apparatus. Each of the detecting arms 23 has a generally L-shape having two arm portions and a roll 27 is rotatably mounted to the lower end of each detecting arm 23 via a bearing (not shown). The veneer detector 19 further includes a microswitch 25 fixed to the frame (not shown) of the apparatus at a position adjacent to the upper end of each detecting arm 23 and configured to be turned on when contacted by the upper end of the detecting arm 23.

In such veneer detector 19, the detecting roll 27 is lifted by any part of a veneer sheet being moved by the first conveyor 16 in arrow direction and passing under the detecting roll 27, which causes the detecting arm 23 to turn about the shaft 21 in counter-clockwise direction. If the lifted amount of the detecting roll 27 is smaller than a predetermined amount that corresponds to the desired veneer thickness, however, the upper end of the detecting arm 23 remains in contact with the microswitch 25 and the microswitch 25 remains on, accordingly. When the roll 27 is raised for a distance corresponding to the above desired veneer thickness and the upper end of the detecting arm 23 is moved away from the microswitch 25, the microswitch 25 is then turned off. When the microswitches 25 are all turned off, it represents that the thickness of the veneer sheet across the width thereof as measured in the lateral direction of the apparatus has become full or effective suitable for manufacturing of the laminated wood product. Thus, the position on the veneer sheet at which the microswitches 25 are turned on is considered as the boundary between the defective portion and the product veneer sheet.

The veneer cutting and sorting station or the veneer cutting and sorting apparatus A1, as the case may be, is located downstream of the first veneer conveyor 16. Chain double-dashed line B in FIG. 1 shows an imaginary plane located at a height that is level with the outer surfaces of conveyor belts 16A of the upper leg of the first veneer conveyor 16.

Referring to FIGS. 2-1 and 2-2, reference symbols 30A, 30B designate a pair of upright support columns disposed on the opposite sides of the apparatus. A pair of upper and lower rolls 29, 31, which are examples of the rotatable bodies of the invention, is supported at the opposite end shafts 29A, 31A thereof by the support columns 30A, 30B, respectively.

Numeral 28 in FIG. 2-2 generally designates a gear transmission which is an example of the drive transmission of the invention. The gear transmission 28 has on the right side in FIG. 2-1 four gears 38A, 38B, 38C and 38D for driving the upper and lower rolls 29, 31 in opposite direction. The end shafts 29A, 31A of the upper and lower rolls 29, 31 are rotatably supported by bearings 34, 36 which are in turn mounted in the support columns 30A, 30B, respectively. The gears 38A, 38D are fixed on the end shafts 29A, 31A that extend axially outward of the right support column 30B.

The other two gears 38B, 38C of the gear transmission 28 are fixed on short shafts 40A, 40B that are mounted to the right support column 30B through bearings 26, 32, respectively, and engaged with the gears 38A, 38D, respectively, as shown in FIG. 2-2. As shown in FIG. 2-1, the shaft 40B is operatively connected to a servomotor 42, which corresponds to the at least one drive source. In such arrangement of the four gears 38A, 38B, 38C, 38D in the gear transmission 28, driving the shaft 40B for the gear 38C in arrow counter-clockwise direction as shown in FIG. 2-2 causes the upper shaft 29A, and hence the gear 38A, to rotate in the same counter-clockwise direction and the lower shaft 31A, and hence the gear 38D, in opposite clockwise direction. The servomotor 42 connected to the shaft 40B for the gear 38C is operable to controllably, or stoppably or intermittently, drive the shaft 40B in arrow direction in response to a control signal from a control 52 which will be described later.

Referring to FIGS. 1 and 2-2, a knife blade mounting 35, which is an example of the first mounting of the invention, is fixedly mounted to the lower roll 31 for rotation therewith. The knife blade mounting 35 is formed extending substantially the length of the lower roll 31 in the axial direction thereof and projecting radially outwardly from the periphery of the lower roll 31. A knife blade 39 is fixed to the distal end of the knife blade mounting 35, projecting radially outwardly and extending the length of the knife blade mounting 35 in the axial direction of the lower roll 31. The knife blade 39 has at the tip end thereof a cutting edge 39A. Similarly, a knife edge receiver mounting 33, which is an example of the second mounting of the invention, is fixed to the upper roll 29 for rotation therewith, formed extending substantially the length of the upper roll 29 in the axial direction thereof and projecting radially outwardly from the periphery of the upper roll 29. The knife edge receiver mounting 33 has at the distal end thereof a knife edge receiver 37 having a surface 37A. The knife edge receiver 37 is made of a material such as urethane rubber that is hard only to such an extent that gives no damage to the cutting edge 39A of the knife blades 39 and formed extending continuously along the knife blade 39. The surface 37A of the knife edge receiver 37 serves as the cutting edge receiving surface on which veneer is cut by the knife blade 39. The lower roll 31, the knife blade mounting 35, and the knife blade 39 having the cutting edge 39A cooperate to constitute a knife assembly 12, and the upper roll 29, the knife edge receiver mounting 33, and the knife edge receiver 37 having the cutting edge receiving surface 37A cooperate to constitute a knife edge receiver assembly 14, respectively. In the illustrated first embodiment shown in FIG. 1, the knife edge receiver assembly 14 is disposed above the knife assembly 12 across the aforementioned imaginary plane B, as shown in FIG. 1.

Referring again to FIG. 1, a second veneer conveyor 41 is located downstream of the veneer cutting and sorting station A1 and spaced therefrom at a distance that is large enough for a defective portion of veneer cut off from veneer sheet to be dropped off through the space formed between the first and the second conveyors 16, 41, as will be described in detail later, including a plurality of endless belts disposed at a spaced interval in the lateral direction of the apparatus. The second veneer conveyor 41 runs constantly in arrow direction at the same speed S as the first conveyor 16. As seen from the drawing, the second conveyor 41 is arranged with the upper conveying surface thereof located at a level that is lower than the counterpart surface of the first conveyor 16.

The veneer sheet cutting station C is located downstream of the second conveyor 41. The veneer sheet cutting station C is configured to cut a continuous veneer sheet into discrete veneer sheets each having a length L, or a dimension as measured in the direction in which veneer sheet is conveyed, for producing veneer sheets of a desired format size, for example 4'×8', from a continuous sheet of veneer. The veneer sheet cutting station C includes a pair of upper and lower rolls 43, 47 extending parallel to the rolls 29, 31 and rotatable in opposite arrow directions. The upper roll 43 has fixed thereto two knife blades 46 extending radially outward in opposite directions from the periphery of the roll 43 and symmetrically relative to the axis of the roll 43. Each knife blade 46 has such a dimension as measured radially from the peripheral surface of the roll 43 that the distance between the cutting edges of the two knife blades 46 as measured along an imaginary circle that is described by the cutting edges when the roll 43 is rotated corresponds to the above length L. The roll 43 is driven to rotate by a motor 45 at such a speed that the cutting edges of the knife blades 46 are revolved at a speed corresponding to the speed S. The motor 45 is operable in response to a signal transmitted from the control 52.

The veneer sheet cutting station C further includes an anvil roll 47 that is clad with a material such as urethan rubber that provides a cutting edge receiving surface on which a veneer sheet is cut by the knife blade 46. The anvil roll 47 is driven by a motor (not shown) to rotate constantly at the peripheral speed S. Cutting of veneer sheet at the station C is accomplished by revolving the knife blades 46 on the roll 43 that is rotatable in response to a signal from the control 52 that receives from the veneer detector 19 a signal that is indicative of the detection of the boundary P. Specifically, the veneer sheet cutting station C is operable to make a cut by starting to rotate the rolls 43, 47 at such a timing that the cut is made by the knife blade 46 when the cut leading edge PA of the product veneer sheet has moved a distance corresponding to the above length L from a predetermined position adjacent to the station C. After such first cut is made, the veneer sheet 61 is cut continuously into discrete veneer sheets.

A third veneer conveyor 49 is disposed downstream of the veneer sheet cutting station C. As with the previous veneer conveyors, the third veneer conveyor 49 includes a plurality of endless belts arranged at a spaced interval in the lateral direction of the apparatus and running constantly in arrow direction at the same speed S as the first and the second conveyors 16, 41. The veneer stacking station 51 is disposed downstream of the third veneer conveyor 49 to receives cut veneer sheets 53 of the desired format size and stack them onto a support 55 into a pile.

The apparatus according to the above first embodiment operates as follows. FIG. 1 shows the initial standby state of the knife assembly 12 and the knife edge receiver assembly 14 of the veneer cutting and sorting apparatus. A1. It is noted that, for the sake of illustration, the veneer lathe 1 and the veneer detector 19 are shown in FIG. 1 in operating state. In the initial state of the veneer lathe 1, a peeler block 15 is held and driven by the spindles 13 to rotate at the constant peripheral speed S, but knife carriage 3 and the spiked wheels 11 are set in the retracted position away from the block 15, and the shaft 9 for the spiked wheels 11 is driven to rotate at such a speed that the tip ends of the spiked wheels 11 are revolved at the peripheral speed S. In the veneer detecting station 19, the upper ends of the detecting arms 23 are all in contact with the microswitches 25 because no veneer is then present on the first conveyor 16 and the microswitches 25 are all in on state. The upper and the lower rolls 29, 31 of the knife edge receiver assembly 14 and the knife assembly 12 at the veneer cutting and sorting station A1 are both placed at angular positions where the knife blade mounting 35 and the knife edge receiver mounting 35, 33 are directed facing toward the first veneer conveyor 16, as shown in FIG. 3-1. The roll 43 in the veneer sheet cutting station C is placed at an angular position where the opposite knife blades 46 are directed horizontally, as shown in FIG. 3-1.

From such initial state of the veneer lathe 1, the knife carriage 3 starts to move toward the rotating peeler block 15 for a distance corresponding to a desired thickness of veneer sheet to be peeled for each rotation of the spindles 13. In the meantime, the cutting edge of the knife blade 5 mounted in the knife carriage 3, the nose bars 7, and the spiked wheels 11 are brought into operative engagement with the peripheral surface of the block 15, as shown in FIG. 1. The spiked wheels 11 engaged with the block 15 at the periphery thereof assists in driving the block 15 from the periphery and the block 15 is cut or peeled by the veneer knife blade 5 into veneer sheet 57 while being pressed by the nose bars 7 immediately above the cutting edge of the knife 5. The veneer sheet 57 comes out from the veneer lathe 1 at the speed S while being guided on the knife carriage 3 and then transferred to the first veneer conveyor 16.

As mentioned earlier, the leading edge portion of veneer as peeled from a block 15 has a varying thinness, and a part of the veneer sheet 57 having a thickness smaller than desired is not suitable for the manufacture of wood laminated product such as plywood, LVL, etc. and, therefore, need be removed. Such part of the veneer sheet 57 will hereinafter be referred to as defective portion 59. Veneer sheet 57 having such defective portion 59 is received by the first veneer conveyor 16 and then moved past the detecting rolls 27 at the veneer detecting station 19, where part of the veneer sheet 57 having a thickness smaller than desired causes the detecting roll 27 to be lifted and the detecting arm 23 to be turned in counter-clockwise direction, but the microswitch 25 remains off because of the limited lift of the detecting roll 27 due to the deficient thickness. In the meantime, with further movement of the veneer sheet 57, the leading edge portion of the defective portion 59 of the veneer sheet 57 begins to droop down by its own weight, leaving the first veneer conveyor 16 without reaching the second conveyor 41, as indicated by solid line in FIG. 3-1. Incidentally, the chain double-dashed line extending above the solid line will be explained with reference to the seventh embodiment of the invention.

When the detecting rolls 27 are all lifted for the above predetermined distance, as shown in FIG. 3-2, and the microswitches 25 are all turned off, accordingly, the veneer detector 19 generates to the control 52 a detection signal that indicates the detection of a boundary P between the defective portion 59 and its succeeding product veneer sheet 61. As stated earlier, the boundary P in FIG. 3-2 is actually an imaginary line extending across the direction in which the veneer sheet is moved by the conveyor 16 and between the defective portion 59 and the product veneer sheet 61.

Figures 1, 4:
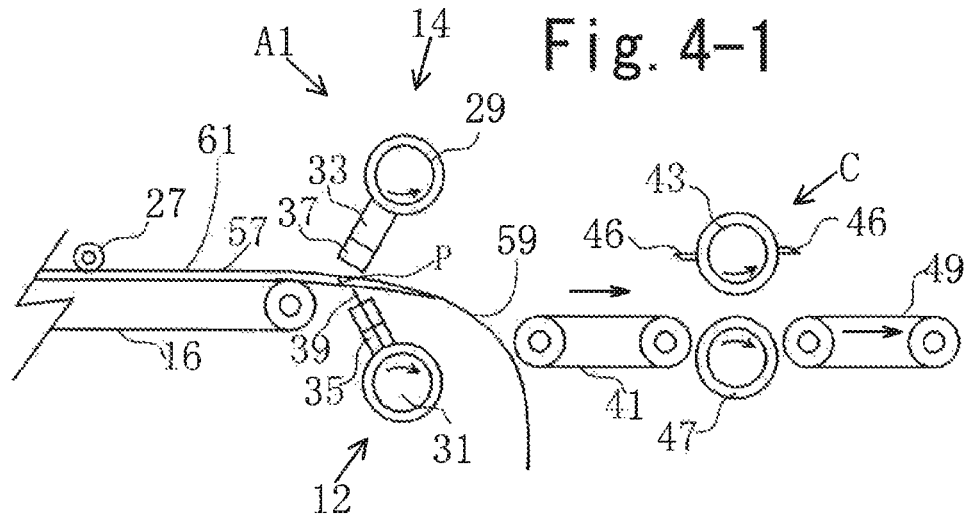
FIG. 1 is a schematic side view showing an apparatus according to first embodiment of the present invention that is incorporated in a veneer production line including a rotary veneer lathe.
Figures 2, 4:
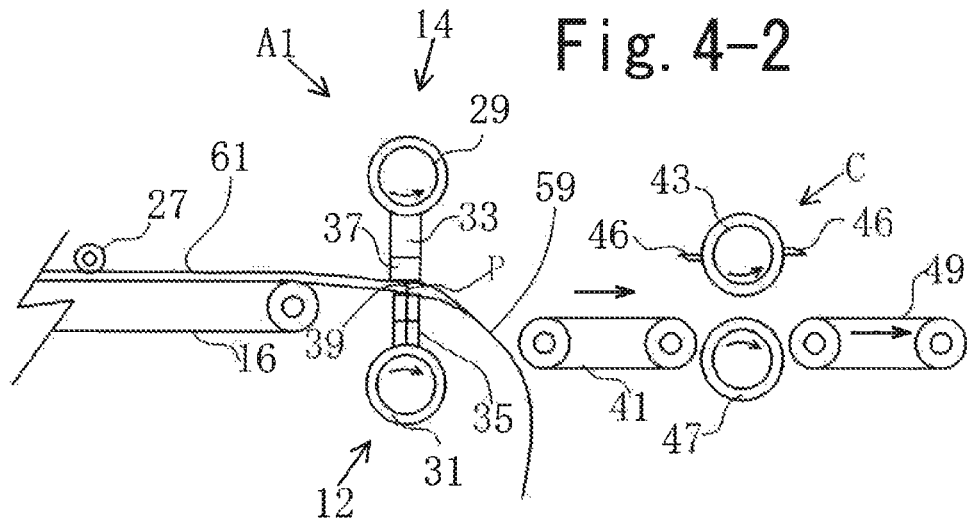

The position of the boundary P in the veneer sheet 57 being moved by the first conveyor 16 is constantly monitored and determined by the control 52 based on the detection signal from the veneer detector 19. When the boundary P reaches a position between the knife blade and the knife edge receiver assemblies 12, 14, as shown in FIG. 4-1, the control 52 transmits to the servomotor 42 a signal that cause the rolls 31, 29 to start rotating at such a timing that the cutting edge 39A of the knife blade 39 and the cutting edge receiving surface 37A of the knife edge receiver 37 revolving at the same peripheral speed are moved to the position shown in FIG. 4-2 where the veneer sheet 57 is cut at the boundary P by the knife blade 39 on the edge receiving surface 37A. Just before and after and also during the cutting, the knife blade 39 performs the function of not only cutting the veneer 57, but supporting the veneer sheet 61 at the bottom thereof, while the knife edge receiver 37 receives the cutting edge 39A of the knife blade 39, while simultaneously holding down the veneer sheet 57 at the boundary.

Figures 1, 5:
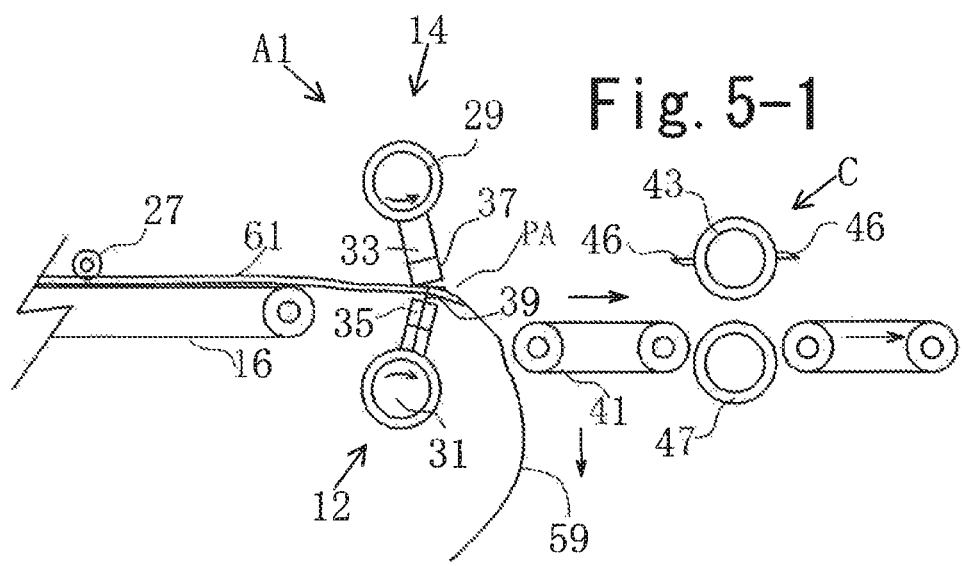
Figures 2, 5:
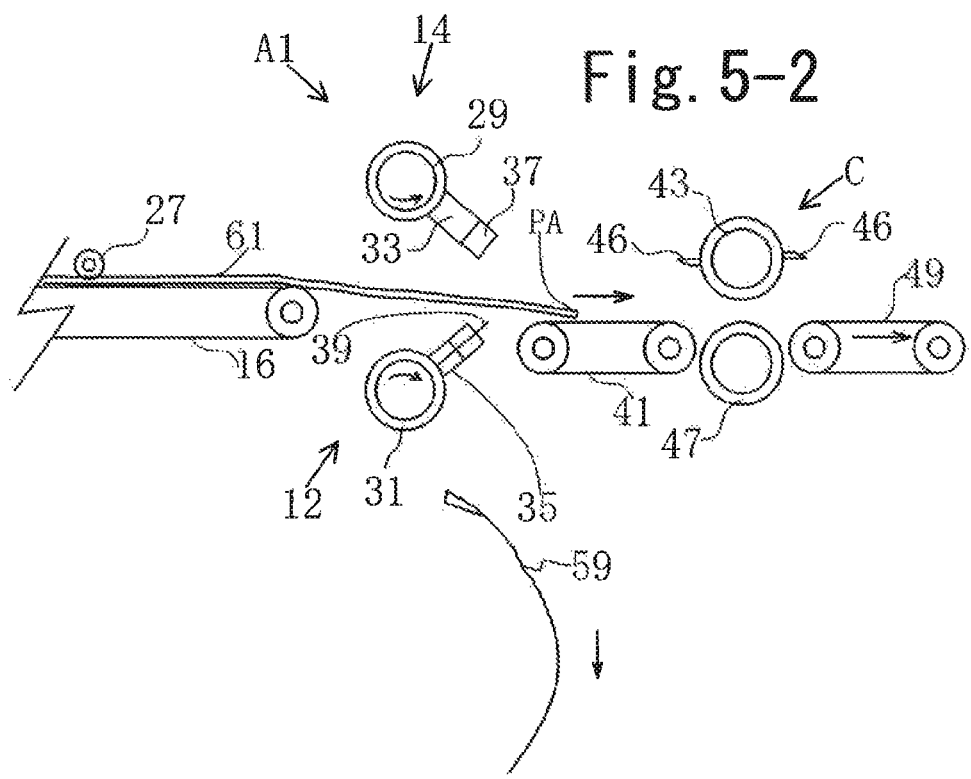

With further rotation of the rolls 29, 31, the defective portion 59 cut off from the veneer sheet 57 is not supported any more and, therefore, dropped off by its own weight, as shown in FIG. 5-1. On the other hand, the product veneer sheet 61 after having its preceding defection portion 59 cut off therefrom is supported at the bottom surface thereof, although only for a limited period of time, by the knife blade 39 at a position adjacent to the boundary P. Although part of the product veneer sheet 61 adjacent to the boundary P may droop slightly by its own weight only for a short period of time, the veneer sheet 61 is moved toward the second conveyor 41 without drooping significantly. FIG. 5-2 shows a state where the veneer sheet 61 is transferred to the second conveyor 41. The transferring is performed smoothly because the conveying surfaces of the upper legs of the endless belts of the second conveyor 41 are located at a level below the similar conveying surfaces of the first conveyor 16. As shown in FIG. 5-2, the leading edge of the effective veneer sheet 61, which is generated by cutting veneer 57 at the boundary P, will be indicated by a symbol PA.

Figures 1, 6:
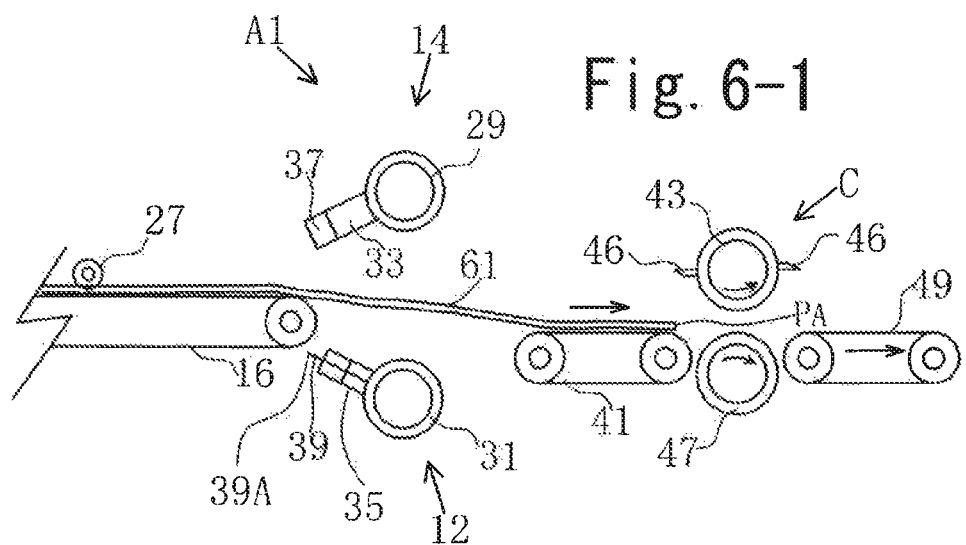
Figures 2, 6:
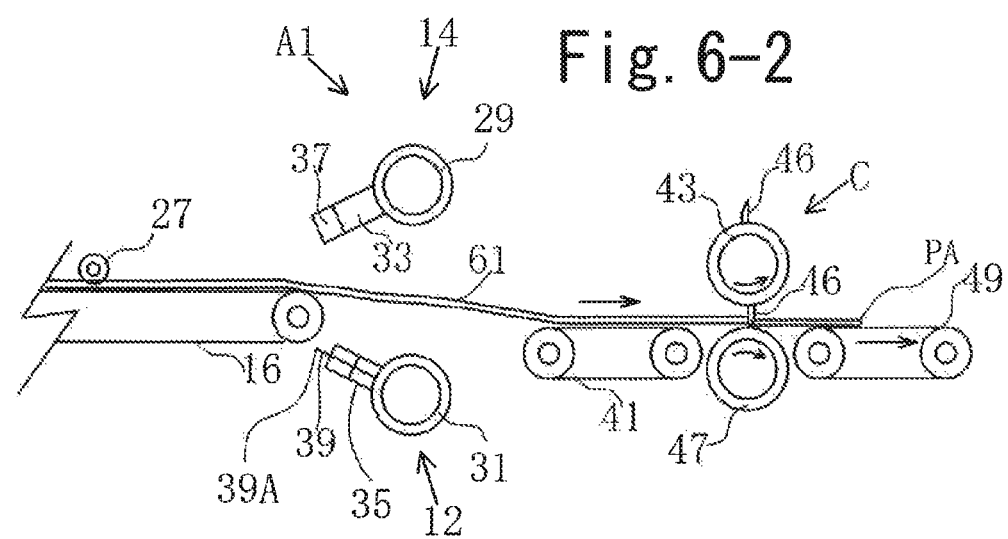
Figures 1, 7:
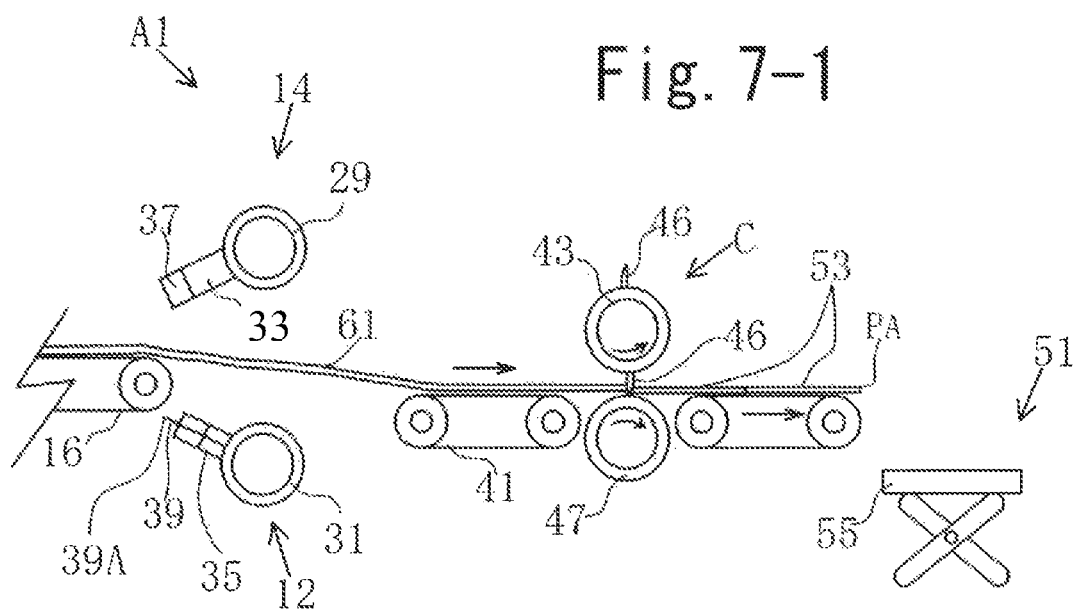
Figures 2, 7:
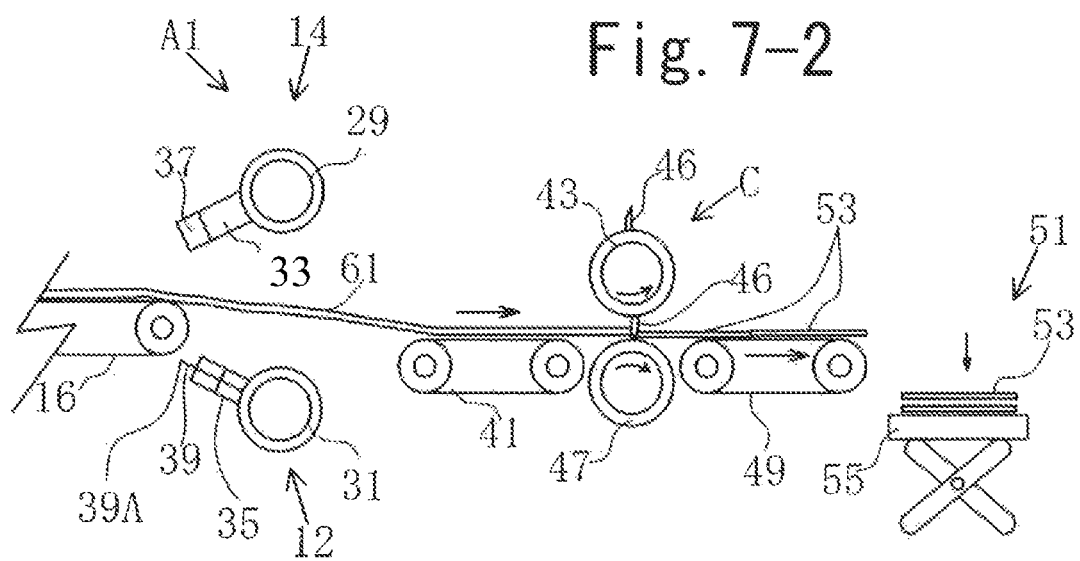

The veneer sheet 61 thus transferred is moved by the second conveyor 41 at the speed S toward the veneer sheet cutting station C, as shown in FIG. 6-1. After cutting of the veneer sheet 57 by the knife blade 39 at the veneer cutting and sorting station A1 is over, the servomotor 42 is stopped in response to a signal from the control 52 so as to stop the upper and lower rolls 29, 31 at the initial standby positions, as shown in FIG. 6-1. The position of the cut leading edge PA of the veneer sheet 61 being moved by the second conveyor 41 is also monitored constantly by the control 52. The roll 43 carrying the knife blades 46 is so controlled by the control 52 that cutting of the veneer sheet 61 by either one of the knife blades 46 is made when the leading edge PA has moved for a distance that corresponds to the aforementioned predetermined length L from a predetermined position adjacent to the veneer sheet cutting station C, as shown in FIG. 6-2, so that a discrete veneer sheet 53 is cut off from the continuous sheet of veneer sheet 6. Thereafter, the rolls 43, 47 continue to rotate to cut the veneer sheet 61 continuously. As a result, the continuous sheet of veneer sheet 61 is cut into a plurality of discrete veneer sheets 53 having a predetermined format size, as shown in FIG. 7-1. Such veneer sheets 53 are stacked into a pile at the veneer stacking station 51, as shown in FIG. 7-2.

As is apparent from the above description, according to the first embodiment of the invention, cutting off the defective portion 59 from the veneer sheet 57 and the subsequent sorting between the defection portion 59 and the product veneer sheet 61 are performed without stopping the conveyance of veneer sheet peeled from a peeler block 15. The defective portion 59 being moved on the first conveyor 16 is not supported any more after being cut off from the effective veneer sheet 61 and therefore dropped by its own weight from the first conveyor 16. On the other hand, the product veneer sheet portion 61, which is supported by the knife blade 39 at a position adjacent to the cut leading edge PA, as shown in FIGS. 4-2 and 5-1, will not droop significantly immediately after leaving the knife blade 39. Unlike the defective portion 59, the product veneer sheet 61 is moved substantially along a straight path without drooping, as shown in FIG. 5-2. Thus, the defective portion 59 and its succeeding veneer sheet 61 are sorted successfully without stopping the forward movement of veneer sheet.

Figure 8:
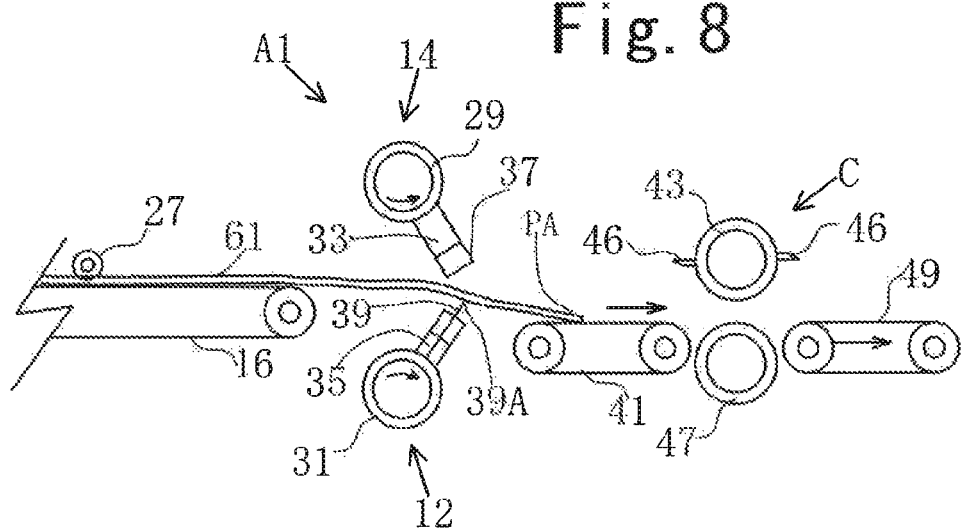

Alternatively, after cutting off the defective portion 59 at the station A1, the rolls 29, 31 may be stopped temporarily at the angular positions shown in FIG. 8, where the product veneer sheet 61 may be supported by the cutting edge 39A of the knife blade 39. By virtue of the gear transmission 28 using four gears 38A, 38B, 38C and 38D, the rotation of the upper and lower rolls 29, 31 are stopped synchronously. The veneer sheet 61, which is then supported for a longer period of time by the cutting edge 39A of the knife blade 38, may be transferred to the second conveyor 41 with increased stability.

SECOND EMBODIMENT

Figures 1, 9:
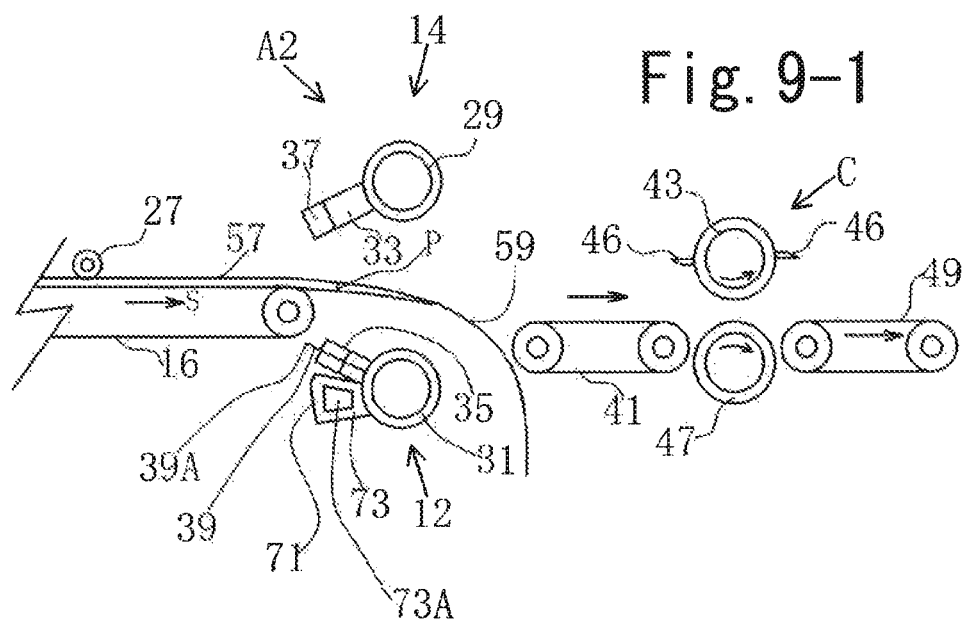
Figures 2, 9:
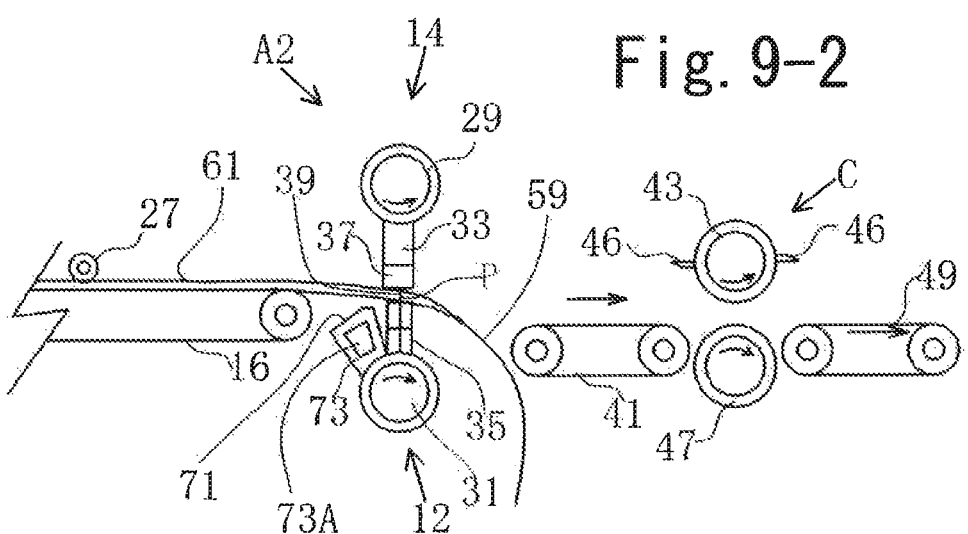
Figures 1, 10:
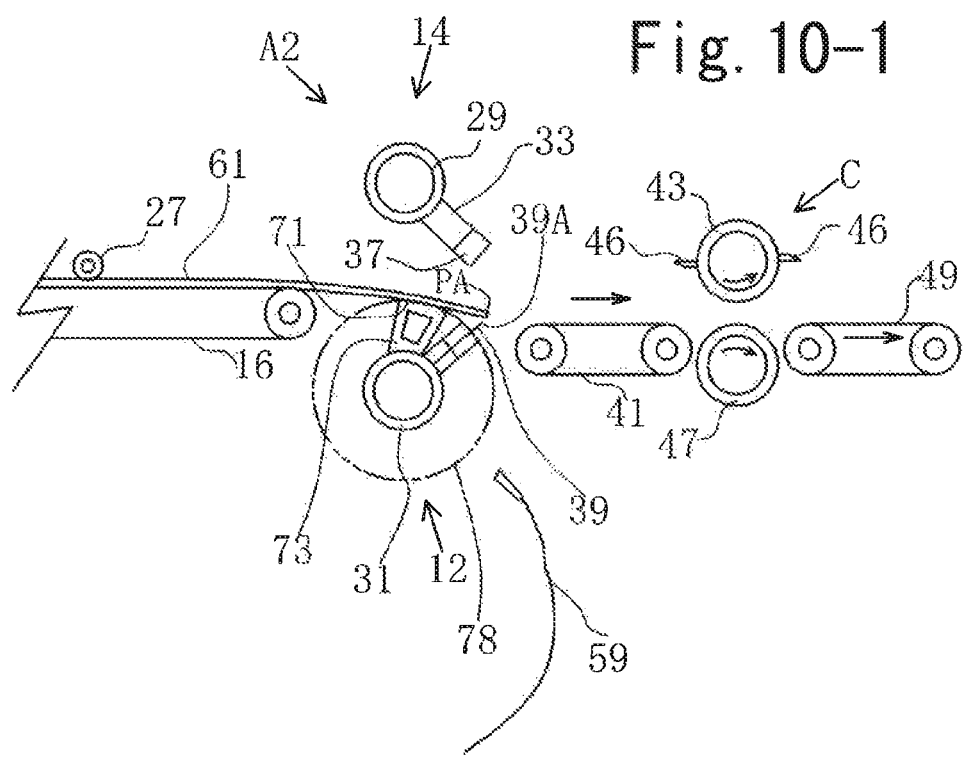
Figures 2, 10:
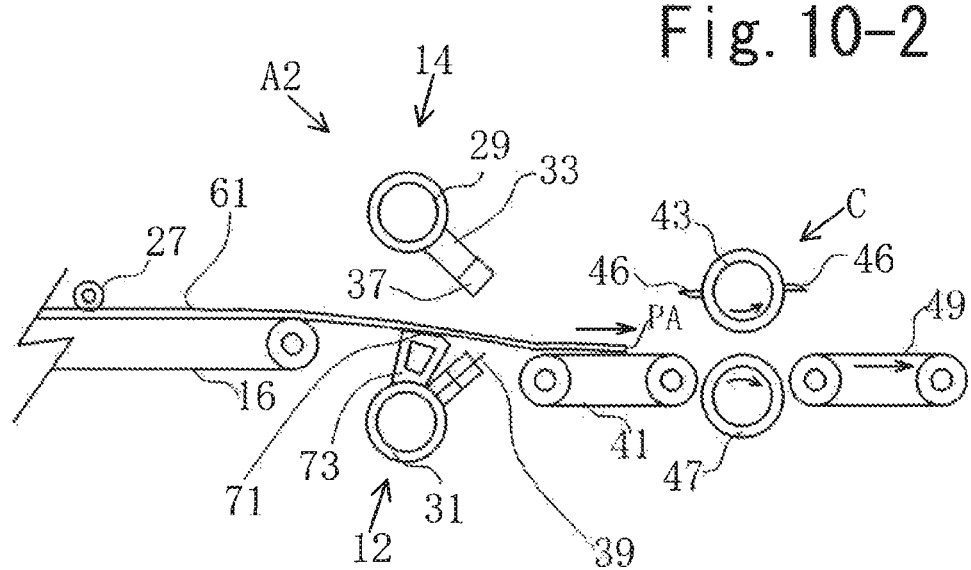

The second embodiment differs from the first embodiment in that the veneer cutting and sorting station A1 of the first embodiment is substituted with a station A2 shown in FIG. 9-1 and, therefore, the following description will focus on the veneer cutting and sorting station A2. Specifically, the veneer cutting and sorting station A2 differs from the counterpart station A1 of the first embodiment in that a plurality of auxiliary support members 73, which is an example of the support of the invention, is fixedly mounted on the lower roll 31 for rotation therewith and formed projecting radially outwardly from the periphery of the roll 31. The support members 73 are arranged at a spaced interval along the axis of the roll 31. As shown in FIG. 9-1, each of the auxiliary support members 73 is located immediately behind, or at a position adjacent to and on the trailing side of the knife blade mounting 35 with respect to the rotational direction of the roll 31. The auxiliary support member 73 has a surface 71 that supports and guides the product veneer sheet 61 at the bottom thereof. As shown in FIG. 10-1, the support surface 71 is formed with a curve that describes an imaginary circle 78 having its center at the axis of rotation of the roll 31 when the roll 31 is rotated.

Alternatively, the auxiliary support members 73 may be replaced with a single member having a continuous support surface extending the length of the knife blade 39 in axial direction of the lower roll 31. Furthermore, the support surface 71 may not necessarily be formed to coincide with the imaginary circle 78, but the surface 71 may be formed slightly away from the circle 78 as long as the veneer sheet 61 is supported and guided securely while being transferred from the first conveyor 16 to the second conveyor 41. As shown, for example, in FIG. 9-1, the auxiliary support member 73 has formed therein a void portion 73A to reduce the mass and to permit the first knife assembly 12 to rotate at a high speed.

The following will describe the operation of the apparatus of the second embodiment. As shown in FIG. 9-1, the initial state of the apparatus of the second embodiment is substantially the same as that of the apparatus of the first embodiment shown in FIG. 3-1. FIG. 9-1 also shown that a veneer sheet 57 peeled by the veneer lathe 1 is moving under the detecting rolls 27 and conveyed on the first veneer conveyor 16 at the speed S. The current position of the moving boundary P is monitored constantly by the control 52.

As the boundary P reaches a predetermined position in the veneer cutting and sorting station A2 as shown in FIG. 9-1, the control 52 generates to the servomotor 42 a signal that cause the rolls 29, 31 to start to rotate at such a timing that the time when the boundary P reaches the cutting position immediately below the upper rotatable roll 29 coincides with the time when the cutting edge 39A of the knife blade 39 and the edge receiving surface 37A of the knife edge receiver 37 are brought into cutting engagement, as shown in FIG. 9-2. Accordingly, the upper and lower rolls 29, 31 start to rotate and the cutting edge 39A of the knife blade 39 and the cutting edge receiving surface 37A of the knife edge receiver 37 revolving at the same peripheral speed S are moved toward the position of FIG. 9-2, where the veneer sheet 57 is cut by the knife blade 39 on the edge receiving surface 37A at the boundary P, thus the defective portion 59 being cut off and separated from the product veneer sheet 61. The servomotor 42 is then stopped in response to a signal from the control 52 thereby to stop the rolls 29, 31 at the angular positions shown in FIG. 10-1, where the auxiliary support members 73 movable with the rollers 29, 31 are positioned in supporting contact at the surfaces 71 thereof with the bottom surface of the veneer sheet 61. The veneer sheet 61 continues to move forward while being supported then by the auxiliary support members 73, as shown in FIG. 10-2.

Just before and during the cutting of the veneer sheet 57 at the veneer cutting and sorting station A2 according to the second embodiment, the product veneer sheet 61 is supported mainly by the knife blade 39 at and adjacently to the boundary P, while the knife edge receiver mounting 33 then holds the veneer sheet 61 and simultaneously receives the cutting edge 39A of the knife blade 39, as shown in FIG. 9-2. After the cutting, the veneer sheet 61 is supported and guided then by the surface 71 of the auxiliary support member 73 toward the second conveyor 41. The veneer sheet 61 is transferred onto the second conveyor 41 while being supported continuously by the auxiliary support member 73 and without stopping the movement of the veneer sheet. Thus, the veneer sheet 61 having the defective portion 59 cut off therefrom is moved toward the second conveyor 41 with an increased stability as compared with the first embodiment. According to the second embodiment, the auxiliary support members 73, which are formed integrally with the roll 31 and hence revolvable integrally with the knife blade 39, are operable in conjunction with the cutting operation of the knife blade 39 without using any special synchronizing mechanism. Operations of the apparatus after the cutting are substantially the same as in the first embodiment and the description thereof will be omitted.

THIRD EMBODIMENT

Figures 1, 11:
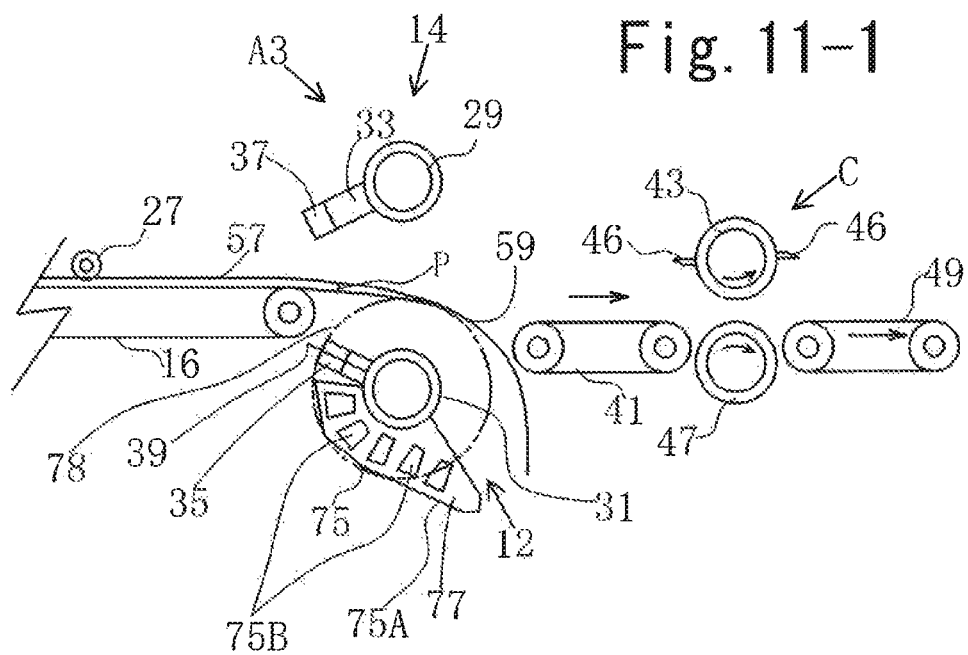
Figures 2, 11:
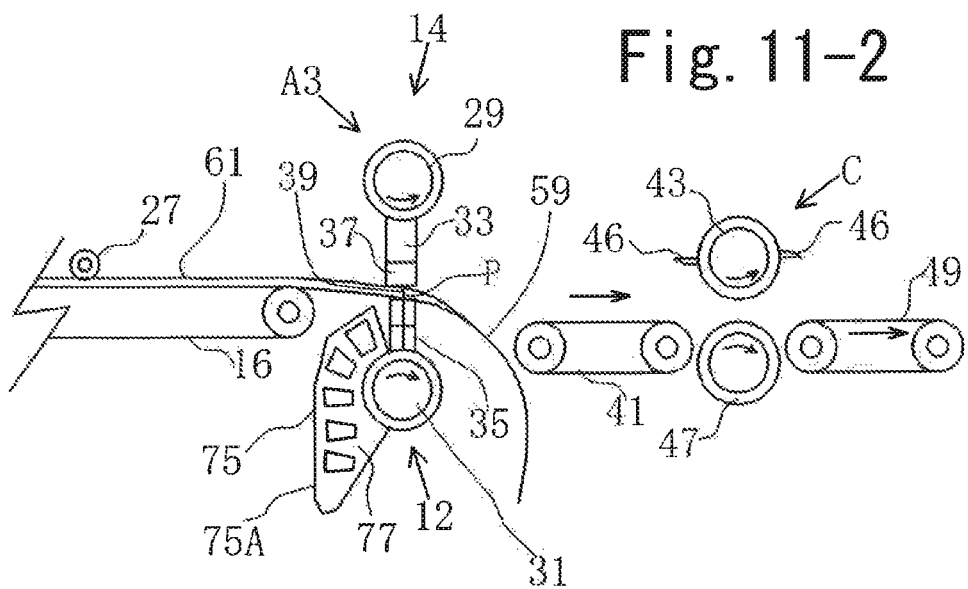

The third embodiment is similar to the second embodiment, but differs therefrom in that the auxiliary support member 73 at the veneer cutting and sorting station A2 is replaced with an auxiliary support member 77 at the veneer cutting and sorting station A3. In the above second embodiment, the veneer sheet 61 is supported by the support surfaces 71 of the auxiliary support members 73 and guided toward the second conveyor 41. However, the area of the support surface 71 of the auxiliary support member 73 is relatively small, which may make the supporting of veneer sheet 61 unstable. In the present third embodiment, there is provided a plurality of auxiliary support members 77 in place of the auxiliary supports 73, each having a support surface 75 whose area is extended backward with respect to the rotating direction of the roll 31, as shown in FIG. 11-1, for stabilizing the supporting of the veneer sheet 61. As with the auxiliary support member 71 in the second embodiment, the auxiliary support member 77 is also positioned immediately behind the knife blade mounting 35. As shown in FIG. 11-1, part of the support surface 75 is formed of a combination of flat and curved surfaces which generally coincide with the aforementioned imaginary circle 78 indicated by chain double-dashed line. Remaining part of the first surface 75 is formed projecting radially outward of the imaginary circle 78 and the surface of such part is indicated by 75A. According to the invention, the support surface 75 need not necessarily be formed along the imaginary circle 78 as long as the veneer sheet 61 is supported securely by the auxiliary support member 77. The auxiliary support member 77 has formed therein a plurality of void portions 75B for the same purpose as the void portions 73A formed in the auxiliary support member 73 of the second embodiment.

FIG. 11-1 shows a state in which the veneer sheet 57 is being conveyed by the first conveyor 16 and the leading defective portion 59 is drooping down without reaching the second conveyor 41. Then, the rolls 29, 31 are rotated by the servomotor 42 to allow the knife blade 39 to cut the veneer sheet 57 at the boundary P on the knife edge receiving surface 37A in the same manner as in the above first and the second embodiment, as shown in FIG. 11-2. During this cutting, the auxiliary support members 77, which are then located immediately behind the knife blade mounting 35, pose no hindrance to the drooping of the detective portion 59 and the cut-off defective portion 59 is dropped off through the space between the first and the second conveyors 16, 41. After the cutting, the rolls 29, 31 are stopped at the angular positions shown in FIG. 12, where the auxiliary support member 77 is positioned so as to close or bridge a major part of the gap between the first conveyor 16 and the second conveyor 41, as shown in FIG. 12. Referring to FIG. 2-3, the auxiliary support members 77 are disposed so that part of the support surfaces 75 of, for example, two adjacent auxiliary support members 77 are located between any two adjacent conveyor belts 16A of the first veneer conveyor 16, which permits the veneer sheet 61 to be supported continuously from the first conveyor 16 and to be transferred to the second conveyor 41 with increased stability, as shown in FIG. 12.

FOURTH EMBODIMENT

Figures 1, 13:
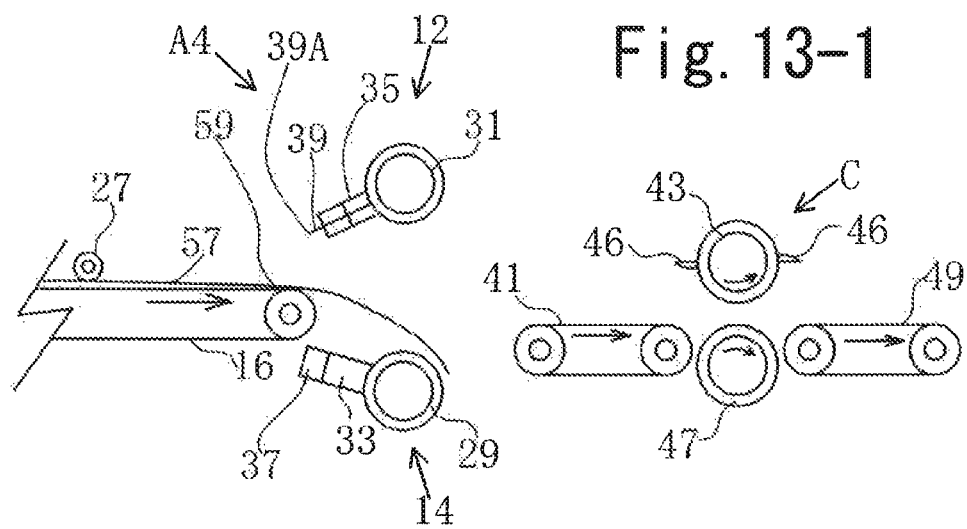
Figures 2, 13:
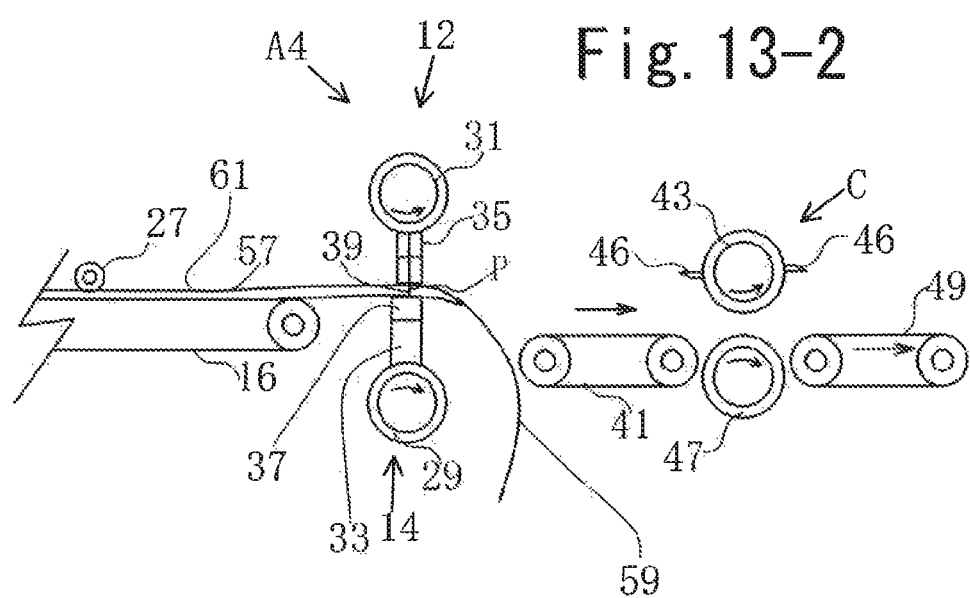

Referring now to FIG. 13-1 showing the veneer cutting and sorting station A4 of the fourth embodiment, it appears similar to the first embodiment, but differs therefrom in that the knife assembly 12 and the knife edge receiver assembly 14 are reversed. Specifically, the knife assembly 12 having the knife blade 39 is disposed above the knife edge receiver assembly 14 having the knife edge receiver 37. The rest of the structure of the fourth embodiment other than the veneer cutting and soring station A4 is substantially the same as the first embodiment.

Figures 1, 14:
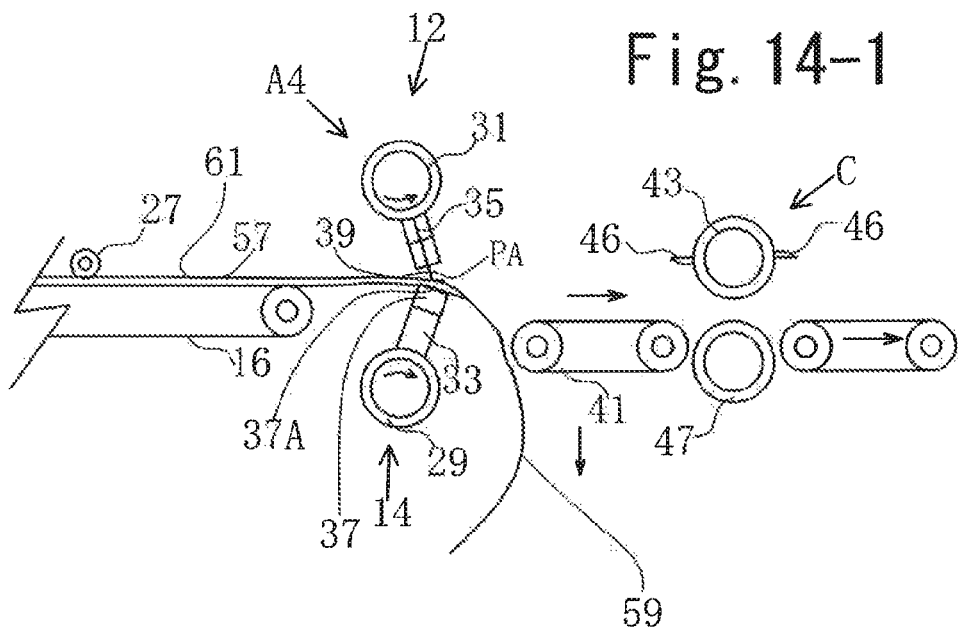
Figures 2, 14:
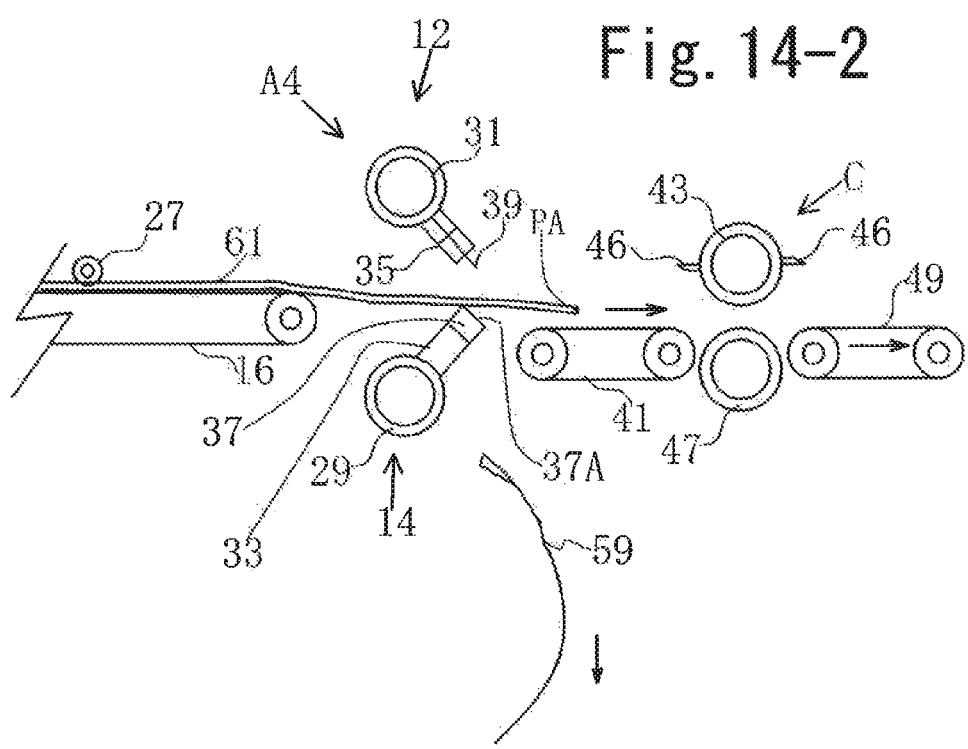

FIG. 13-1, which corresponds to FIG. 3-1 for the first embodiment, shows a state in which the veneer sheet 57 is being conveyed by the first conveyor 16 and the leading defective portion 59 is drooping down without reaching the second conveyor 41. As with the first embodiment, the control 52 causes the servomotor 42 to start rotating the upper and lower rolls 29, 31 at an appropriate timing so that the veneer sheet 57 is cut by the knife blade 39 on the knife cutting edge receiving surface 37A at the boundary P, as shown in FIG. 13-2. During and after the cutting, the product veneer sheet 61 being moved forward is supported at the bottom thereof by the knife edge receiver 37, as shown in FIG. 14-1. The rolls 29, 31 are stopped at the angular positions shown in FIG. 14-2, where the veneer sheet 61 is transferred from the first conveyor 16 to the second conveyor 41 while being supported securely by the knife edge receiver 37, as shown in the drawing. Thus, in this fourth embodiment, the knife edge receiver 37 of the assembly 14 functions as the support for the veneer sheet 61, as well as providing a surface on which the veneer sheet 57 is cut by the knife blade 39. Alternatively, according to the invention, the rolls 29, 31 may be rotated to the initial standby position shown in FIG. 13-1 without stopping at the position of FIG. 14-2.

FIFTH EMBODIMENT

Figures 1, 15:
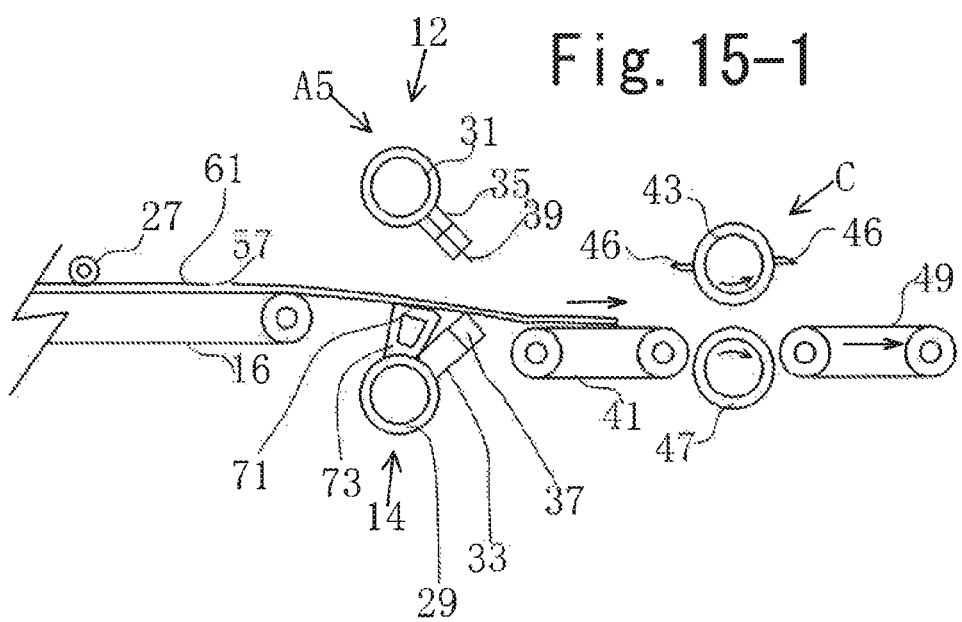
Figures 2, 15:
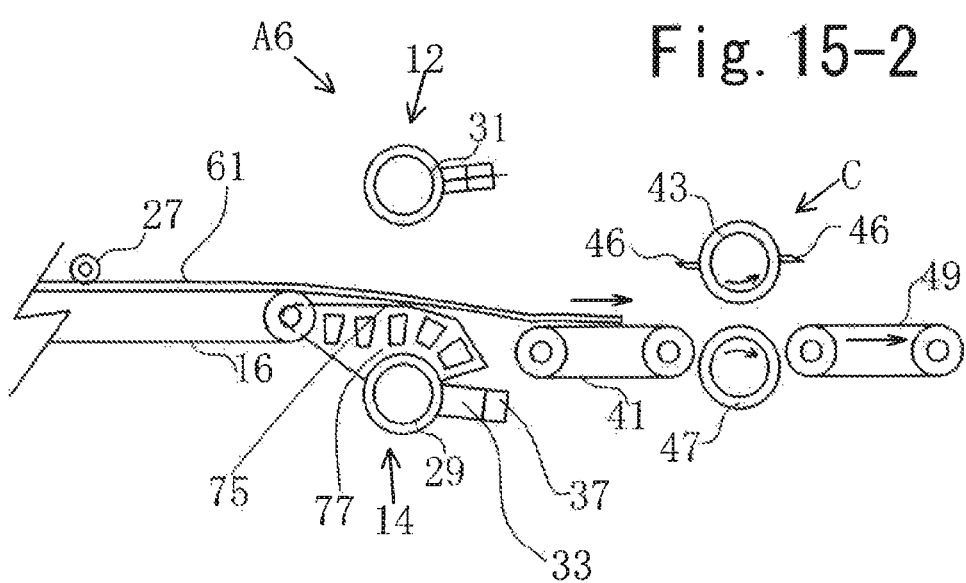

Referring to FIG. 15-1, showing the veneer cutting and sorting apparatus of the fifth embodiment according to the invention, it differs from the above fifth embodiment in that the auxiliary support member 73 used in the second embodiment is fixed mounted on the lower roll 31 behind the knife edge receiver mounting 33. The rest of the structure of the fifth embodiment other than the veneer cutting and sorting station A5 is substantially the same as the fourth embodiment. After cutting the veneer sheet 57 at the boundary P, the rolls 29, 31 are stopped at the angular positions shown in FIG. 15-1, where the product veneer sheet 61 being conveyed by the first conveyor 16 is supported by the auxiliary support member 73 and transferred from the first conveyor 16 to the second conveyor 41.

SIXTH EMBODIMENT

The veneer cutting and sorting apparatus of the sixth embodiment according to the present invention is shown in FIG. 15-2. The veneer cutting and sorting station A6 of the sixth embodiment is similar to that of the above fifth embodiment, but differs therefrom in that the auxiliary support member 73 is replaced with the auxiliary support member 77 that is identical to the counterpart member 75 in the third embodiment. The upper and the lower rolls 29, 31 are operated in the same manner as in the fifth embodiment. After cutting of the veneer sheet 57 at the boundary P, however, the rolls 29, 31 are stopped at the angular position shown in FIG. 15-2 so that the veneer sheet 61 is supported and guided by the enlarged surface 75 of the auxiliary support member 77 and transferred to the second conveyor 41.

SEVENTH EMBODIMENT

Figures 1, 16:
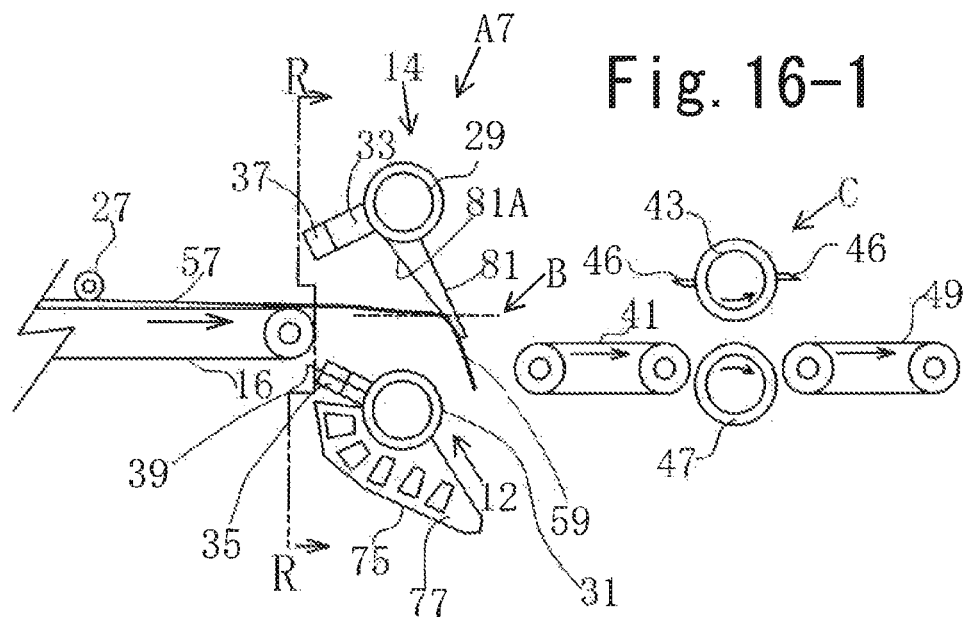
Figures 2, 16:
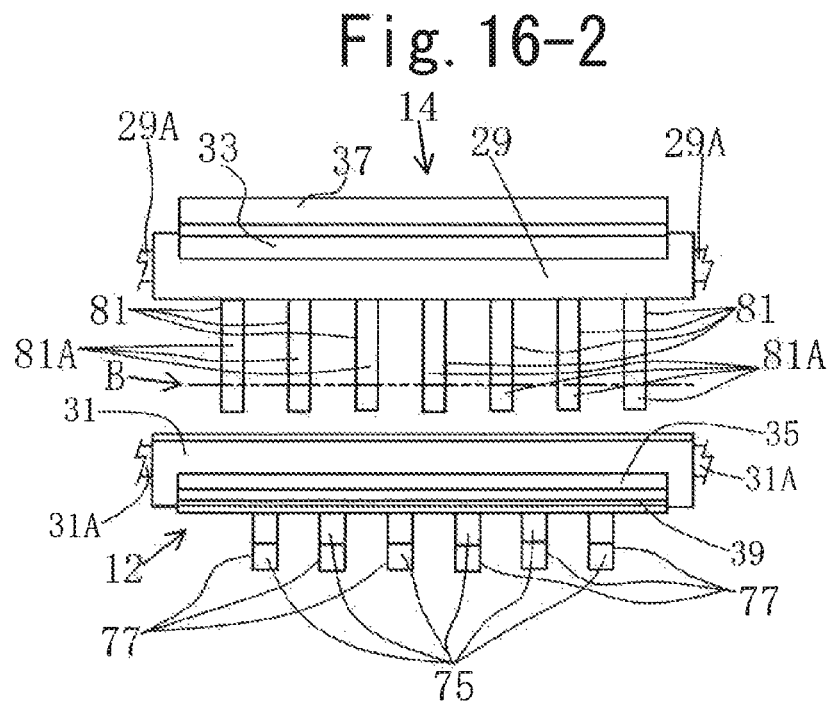

The seventh embodiment shown in FIG. 16-1 is designed specifically to address a problem which may occur if the defective portion 59 tends to droop less from the first conveyor 16, as indicated by chain double-dashed line in FIG. 3-1, for example, because the defective portion 59 as peeled from a block 15 by the veneer lathe 1 is relatively thick. The same problem may occur if veneer is peeled from a peeler block 15 of a hardwood. Such defective portion 59 tending to droop to a less extent may be transferred to the second conveyor 41 without being sorted appropriately.

Referring to FIGS. 16-1 and 16-2, the knife edge receiver assembly 14 at the veneer cutting and soring station includes A7 includes a plurality of guide arms 81 fixedly mounted on the upper roll 29 at a spaced interval in the axial direction of the roll 29. The guide arm 81 is an example of the guide of the invention. As with the knife edge mounting member 33, the guide arms are formed extending radially outward from the periphery of the upper roll 29. In the initial position of the apparatus shown in FIG. 16-1, the upper roll 29 is placed at the angular position shown in FIG. 16-1 where each of the guide arms 81 is positioned extending downward and intersecting at an acute angle with the aforementioned imaginary plane B that is level with the conveying surface of the upper leg of the first conveyor belts 16A. The guide arm 81 has a flat guide surface 81A. As shown in FIG. 16-2, which is a schematic view as seen in arrow direction from chain double-dashed line R-R of FIG. 16-1, the guide arms 61 are disposed at such a spaced interval along the axis of rotation of the roll 29 that prevents mechanical interference with the auxiliary support member 77. The rest of the structure of the seventh embodiment other than veneer cutting and sorting station A7 is substantially the same as the third embodiment.

Figures 1, 17:
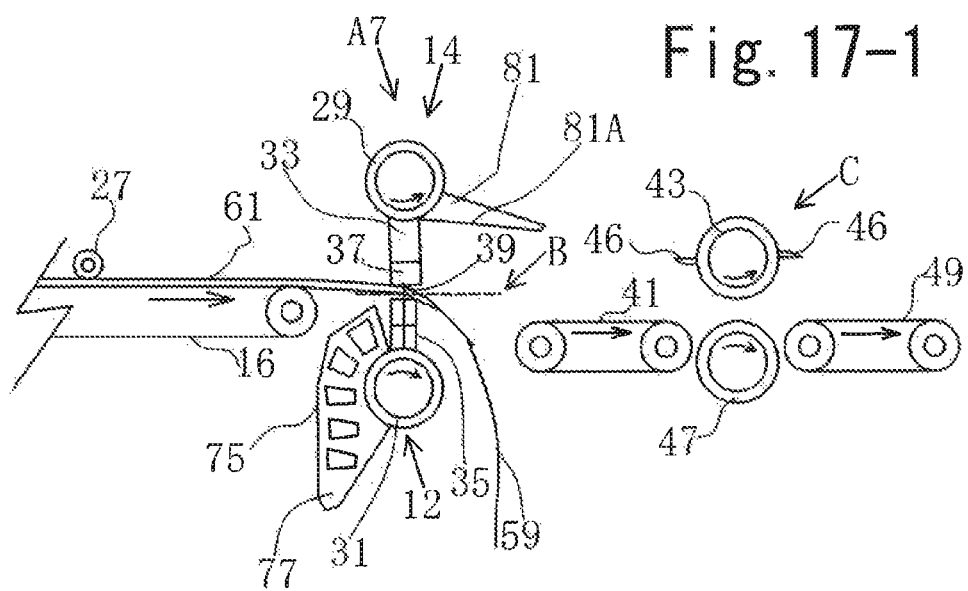
Figures 2, 17:
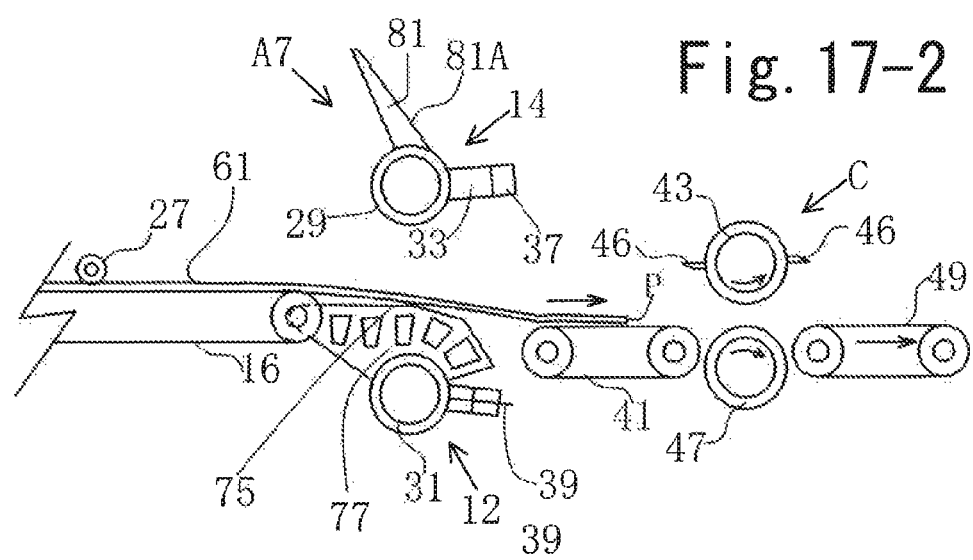

FIG. 16-1 shows the initial state of the first and the second assemblies 12, 14 and also that a veneer sheet 57 having a relatively stiff defective portion 59 is being moved by the first conveyor 16. The leading edge of the defective portion 59 moving toward the second conveyor 41 hits against the surfaces 81A of the guide arms 81 and is diverted downward away from the guide arms 81. As the rolls 29, 31 are rotated by the servomotor 42 for cutting of the veneer sheet 57 at the boundary P, as shown in FIG. 17-1, the guide arms 81 are revolved in counter-clockwise direction, or turned upward as shown in the same drawing, so that the guiding operation by the arms 81 is stopped. The defective portion 59, which has been diverted and cut off by the knife blade 29, is dropped by its own weight through the space between the veneer cutting sorting station A7 and the second conveyor 41 without reaching the second conveyor 41. After the cutting, the rolls 29, 31 are rotated to the angular positions shown in FIG. 17-2, where the veneer sheet 61 is transferred toward the second conveyor 41 while being supported securely by the guide surfaces 75 of the auxiliary support members 77.

MODIFIED EMBODIMENTS

The following will describe various modified embodiments and changes made according to the present invention.

Figures 1, 18:
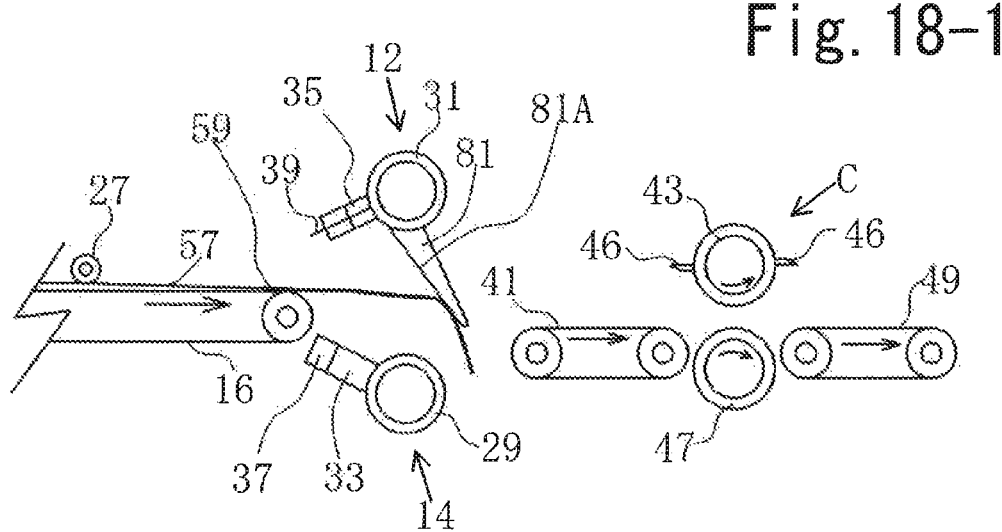
Figures 2, 18:
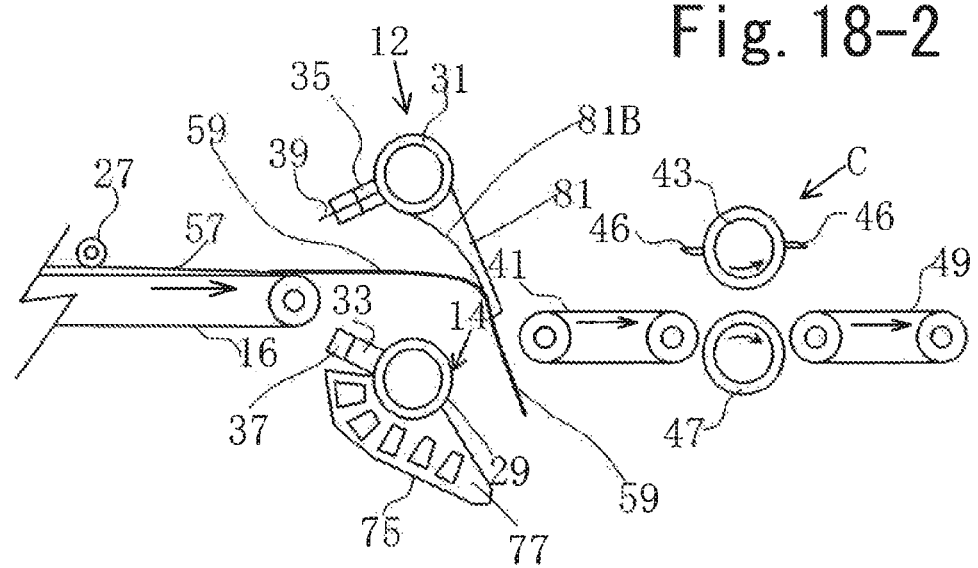

According to the invention, the guide arms 81 used in the seventh embodiment may be mounted on the upper roll 29 or 31, as the case may be, in the first through the sixth embodiments at the same position as in the seventh embodiment. FIG. 18-1 shows an example in which the guide arms 81 are fixed to the upper roll 31 of the knife assembly 12 at the veneer cutting and sorting station A4 of the fourth embodiment shown in FIG. 13-1. As applied to the sixth embodiment shown in FIG. 15-2, the guide arms 81 mounted on the upper roll 31 serve to guide and divert the defective portion 59 downward as shown in FIG. 18-2. As shown in the drawing, the guide arm 81 may be formed with a curved surface 81B instead of the flat surface 81A.

In the above embodiments, veneer sheets cut into a format size are stacked into a pile at the stacking station 51, as shown in FIG. 1. Alternatively, a continuous product veneer sheet such as 61 may be wound or reeled into a roll by using any suitable reeling equipment without cutting into individual sheets.

Detection of the boundary P between the defective portion 59 and the product effective veneer sheet 61 may be done at any position as long as the detection is made before the boundary P reaches a position between the two rolls 29, 31. For example, the profile of a peeler block 15 may scanned previously by using any known equipment for determining the optimal axis of rotation of the block 15 in peeling veneer therefrom for the maximum output of veneer. The block 15 is loaded and set in the veneer lathe 1 in such a position that the optimal axis of the block 15 coincides with the axis of the veneer lathe spindles 13. The time when the peeling operation is just started can be recognized from an increase of the power for driving the spindles 13 and the spiked wheels 11, and time when the boundary P will arrive at the cutting position between the two rolls 29, 31 can be figured out from the number of rotations of the spindles 13 since the start of actual peeling operation because the profile of the peeler block 15 is already known. The control 52 figures out the time at which the boundary P arrives at the cutting position between the two rolls 29, 31 based on the monitored current position of the boundary P and controls the rotation of the rolls 29, 31, accordingly, so that cutting is performed at the position of the boundary P.

Alternatively, the determination of the position of the boundary P may be done, for example, by a lathe operator, who presumes the boundary position by visually checking the shape and the conditions of veneer coming out form the lathe and sends the information of such position to the control 54, which controls the operation of the servomotor for driving the rolls 29, 31 so that the veneer cutting is made at an appropriate timing.

Figures 1, 19:
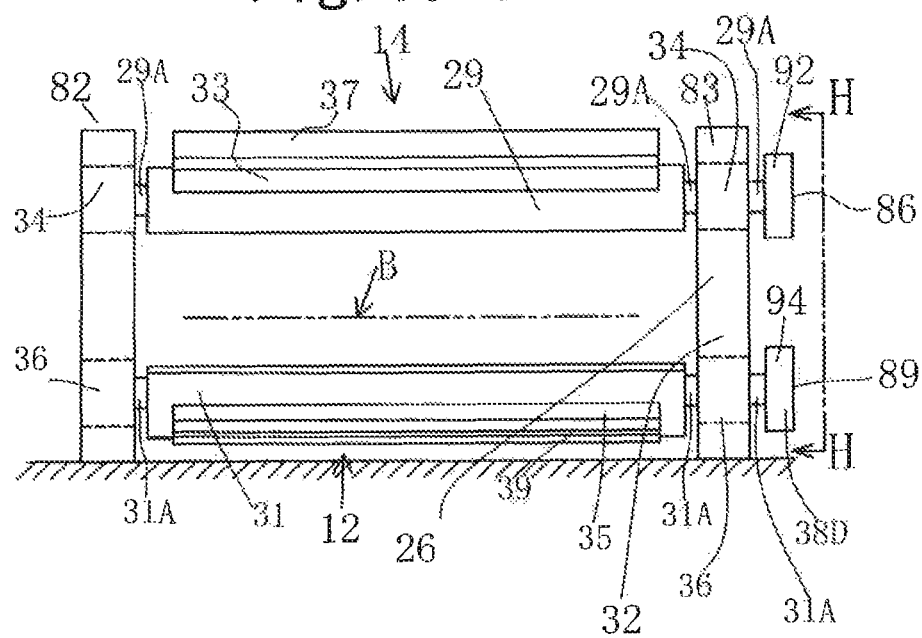
Figures 2, 19:
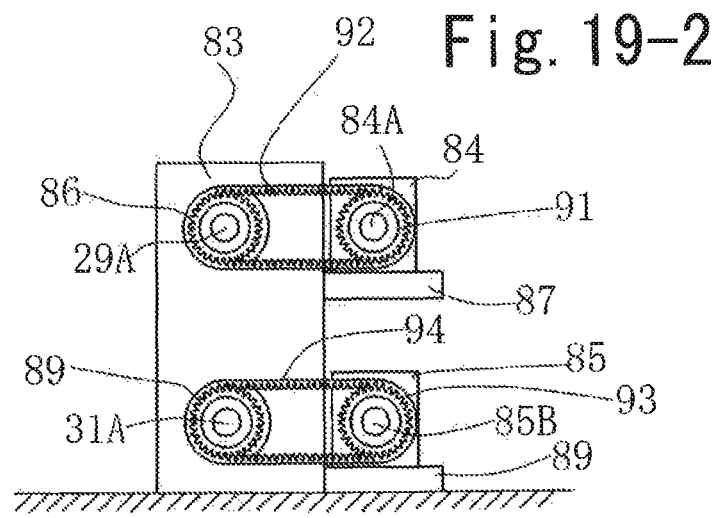

According to the present invention, the gear transmission 28 shown in FIG. 2-2 for driving and synchronizing the rotation of the rolls 29, 31 may be replaced with any other suitable equipment according to any specific control requirement. An alternative transmission device is shown in FIGS. 19-1 and 19-2. The transmission device includes a pair of support columns 82, 83 that rotatably support the upper and lower rolls 29, 31 at the opposite end shafts 29A, 31 thereof through the bearings 34, 36, respectively. Servomotors 84, 85 are fixedly mounted on mounting blocks 87, 89, respectively, as shown in FIG. 19-2, and operatively connected to the respective rolls 29, 31 through timing belts 92, 94. The timing belt 92 is mounted around and between the pulleys 86, 91 that are fixed on the shaft 29A of the upper roll 29 and the output shaft 84A of the servomotor 84, respectively. Similarly, the timing belt 94 is mounted around and between the pulleys 89, 93 that are fixed on the shaft 31A of the lower roll 31 and the output shaft 85B of the servomotor 85, respectively.

In such a drive arrangement, the rolls 29, 31 may be driven to rotate independently of each other by the individual servomotors 84, 85, respectively. This transmission device is applicable to the first through the sixth embodiments. In moving the lower roll 29 or 31 toward the positions shown in FIG. 8 in the first embodiment, FIG. 10-1 in the second embodiment, FIG. 12 in the third embodiment, FIG. 14-2 in the fourth embodiment, FIG. 15-1 in the fifth embodiment, and FIG. 15-2 in the sixth embodiment, it may be so controlled that the upper roll 29 or 31 is moved further than the above positions. In the case of FIG. 15-2 of the sixth embodiment, for example, the lower roll 29 is stopped at the position where the veneer sheet 61 is guided by the support surfaces 75 of the auxiliary support members 77 to be transferred toward the second conveyor 41, while the upper shaft 31 may be rotated further than the position shown in FIG. 15-2 so that the knife blade 39 is placed far away enough for the veneer sheet 61 to be conveyed safely without interfering with the knife blade cutting edge 39A. After the veneer sheet 61 has been transferred to the second conveyor 41, the rolls 29, 31 may be rotated to move the first and the second support members 33, 35 to their initial standby positions, respectively.

In the foregoing embodiments, the second veneer conveyor 41 is disposed with the upper conveying surface thereof located at a level that is lower than the upper conveying surface of the first veneer conveyor 16. If the traveling speed S of the veneer sheet is, for example, about 150 m/min or higher, the defective portion 59 may be guided downward without reaching the second conveyor 41 by using the guide arms such as 81 used in the seventh embodiment. Therefore, the second conveyor 41 need not be disposed as illustrated in various drawings, but may be arranged with the conveying surface set level with that of the first conveyor 15.

In the second through the sixth embodiments, the lower roll 29 or 31, as the case may be, is stopped at the positions shown in FIGS. 10-2, 12-1, 14-2, 15-1, and 15-2, respectively, after cutting of the veneer sheet 57 by the knife blade 39 to allow the auxiliary support member 73 or 77 to support the product veneer sheet 61 being moved by the first conveyor 16. According to the invention, however, the lower roll 29 or 31 need not necessarily be stopped at the above positions, but, as in the case of the first embodiment, it may be so controlled that the lower roll 29 or 31 is rotated until the initial standby position is reached. Even in this case, transferring of the veneer sheet 61 to the second conveyor 41 may accomplished, although the time during which the veneer sheet 61 is supported by the auxiliary support member 73 or 77 is shortened.

In the foregoing relevant embodiments, plural auxiliary support members 72 or 77 are mounted on the lower roll 29 or 31, as the case may be, at a spaced interval along the axis of the roll 29 or 31, which structure is adequate to support the product veneer sheet 61. According to the invention, however, the auxiliary support may be provided by a single body formed extending along the lower roll 29 or 31, although the weight of such auxiliary support will inevitably be increased.

Though, in the foregoing relevant embodiments, the support surfaces 71, 75 of the respective auxiliary support members 73, 77 are formed as a continuous surface extending in the circumferential direction, the support surface may be formed by a plurality of individual surfaces. In this case, the individual surfaces should be formed such that the distance of the respective surfaces to the axis of rotation of the roll 29 or 31 is reduced toward the first or the second support member 35 or 33.

As the drive for controllably driving the rolls 29, 31, a motor such as a stepping motor may be used instead of the servomotor.

What is claimed is:

1. A veneer cutting and sorting apparatus comprising:
   a first conveyor that moves a veneer sheet having at leading end thereof a defective portion to be separated from product veneer sheet, and has a first conveying surface on which the veneer sheet is moved,
   a first assembly disposed downstream of the first conveyor relative to a direction in which the veneer sheet is moved and including a first rotatable body having an axis of rotation extending across the veneer moving direction, a first mounting fixed to and extending axially of the first rotatable body and projecting radially outwardly from the first rotatable body, and a knife blade fixed to distal end of the first mounting and having at tip end thereof a cutting edge,
   a second assembly disposed downstream of the first conveyor relative to the veneer moving direction and including a second rotatable body having an axis of rotation extending parallel to the axis of rotation of the first rotatable body, a second mounting fixed to and extending axially of the second rotatable body and projecting radially outwardly from the second rotatable body, and a knife cutting edge receiver fixed to distal end of the second mounting and having a knife cutting edge receiving surface that receives the cutting edge of the knife blade, at least one drive source that controllably drives the first and the second rotatable bodies through a drive transmission, the drive transmission disposed between the at least one drive source and the first and the second rotatable bodies and configured to permit the first and the second rotatable bodies to rotate in opposite directions, the first and the second assemblies being disposed one above the other across an imaginary extension plane of the first conveying surface of the first conveyor, wherein the knife blade and the knife cutting edge receiver are configured to cooperate to cut the veneer sheet when the cutting edge and the knife cutting edge receiving surface are brought into cutting engagement with each other so that the veneer sheet is cut by the knife blade on the knife cutting edge receiver, a second conveyor disposed downstream of and spaced away from the first and the second assemblies in the direction in which the veneer sheet is moved by the second conveyor, and having a second conveying surface on which the veneer sheet is moved, a veneer detector disposed upstream of the first and the second assemblies and configured to detect an imaginary line of boundary extending across the veneer conveying direction and between the defective portion and product veneer sheet succeeding the defective portion and to generate a detection signal indicative of the detection of the boundary, a control that is operable to determine current position the detected boundary in the veneer sheet being moved by the first conveyor based on the detection signal from the veneer detector and to control the at least one drive source for controllably rotating the first and the second rotatable bodies for cutting of the veneer sheet at the boundary, the control being operable to cause the first and the second rotatable bodies to start rotating from predetermined initial positions thereof at a timing that permits the knife blade to cut the veneer sheet at the boundary on the cutting edge receiving surface, to rotate the first and the second rotatable bodies at speeds that cause the cutting edge of the knife blade and the cutting edge receiving surface to revolve at same peripheral speed at least during cutting of the veneer sheet at the boundary, and, after the cutting of the veneer sheet is over, to allow the first and the second rotatable bodies to be rotated to respective predetermined stop positions, wherein the first assembly is disposed below the second assembly, the apparatus further comprising a support fixed on and projecting radially outwardly from the first rotatable body and having a support surface located adjacent to and behind the first mounting with respect to the direction in which the first rotatable body is rotated, whereby the first and the second assemblies cut the veneer sheet and also support the veneer sheet while allowing the defective portion to drop off by its own weight.

2. A veneer cutting and sorting apparatus according to claim 1, wherein the predetermined stop positions of the first and the second rotatable bodies correspond to the initial positions thereof.

3. A veneer cutting and sorting apparatus according to claim 1, further comprising a guide that is fixed on and extends radially outward from the second rotatable body, has a guide surface, and is positioned where the guide surface extends downward and intersects at an acute angle with the imaginary extension plane when the second rotatable body is placed in the initial position.

4. A veneer cutting and sorting apparatus according to claim 1, wherein the first assembly is disposed above the second assembly, the apparatus further comprising a support fixed on and projecting radially outwardly from the second rotatable body and having a support surface located adjacently to and behind the second mounting with respect to the direction in which the second rotatable body is rotated.

5. A veneer cutting and sorting apparatus according to claim 4, the support includes a plurality of support members fixed on the second rotatable body at a spaced interval in an axial direction thereof.

6. A veneer cutting and sorting apparatus according to claim 4, wherein the control is operable to cause second rotatable body to be stopped at a position that allows the support surface to support the product veneer sheet at the bottom thereof.

7. A veneer cutting and sorting apparatus according to claim 1, further comprising a guide that is fixed on and extends radially outward from the first rotatable body, has a guide surface, and is positioned where the guide surface extends downward and intersects at an acute angle with the imaginary extension plane when the first rotatable body is placed in the initial position.

8. A veneer cutting and sorting apparatus according to claim 1, wherein the second conveyor has a second conveying surface on which the veneer sheet is conveyed, the second conveying surface being located at a level that is lower than the first conveying surface.

9. A veneer cutting and sorting apparatus according to claim 2, wherein the first assembly is disposed below the second assembly, the apparatus further comprising a support fixed on and projecting radially outwardly from the first rotatable body and having a support surface located adjacently to and behind the first mounting with respect to the direction in which the first rotatable body is rotated.

10. A veneer cutting and sorting apparatus according to claim 9, the support includes a plurality of support members fixed on the first rotatable body at a spaced interval in an axial direction thereof.

11. A veneer cutting and sorting apparatus according to claim 2, further comprising a guide that is fixed on and extends radially outward from the second rotatable body, has a guide surface, and is positioned where the guide surface extends downward and intersects at an acute angle with the imaginary extension plane when the second rotatable body is placed in the initial position.

12. A veneer cutting and sorting apparatus according to claim 2, wherein the first assembly is disposed above the second assembly, the apparatus further comprising a support fixed on and projecting radially outwardly from the second rotatable body and having a support surface located adjacently to and behind the second mounting with respect to the direction in which the second rotatable body is rotated.

13. A veneer cutting and sorting apparatus according to claim 12, the support includes a plurality of support members fixed on the second rotatable body at a spaced interval in an axial direction thereof.

14. A veneer cutting and sorting apparatus according to claim 5, wherein the control is operable to cause second rotatable body to be stopped at a position that allows the support surface to support the product veneer sheet at the bottom thereof.

15. A veneer cutting and sorting apparatus according to claim 2, further comprising a guide that is fixed on and extends radially outward from the first rotatable body, has a guide surface, and is positioned where the guide surface extends downward and intersects at an acute angle with the imaginary extension plane when the first rotatable body is placed in the initial position.

16. A veneer cutting and sorting apparatus according to claim 2, wherein the second conveyor has a second conveying surface on which the veneer sheet is conveyed, the second conveying surface being located at a level that is lower than the first conveying surface.

\* \* \* \* \*